United States Patent
Baheti et al.

(10) Patent No.: US 9,317,764 B2
(45) Date of Patent: Apr. 19, 2016

(54) TEXT IMAGE QUALITY BASED FEEDBACK FOR IMPROVING OCR

(71) Applicant: QUALCOMM Incorporated, San Diego, CA (US)

(72) Inventors: Pawan Kumar Baheti, Bangalore (IN); Abhijeet S. Bisain, Bengaluru (IN); Rajiv Soundararajan, Bangalore (IN); Dhananjay Ashok Gore, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 13/843,637

(22) Filed: Mar. 15, 2013

(65) Prior Publication Data
US 2014/0168478 A1 Jun. 19, 2014

(30) Foreign Application Priority Data
Dec. 13, 2012 (IN) .......................... 5200/CHE/2012

(51) Int. Cl.
*G06K 9/20* (2006.01)
*G06K 9/32* (2006.01)

(52) U.S. Cl.
CPC ............ *G06K 9/2054* (2013.01); *G06K 9/2081* (2013.01); *G06K 9/3258* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 2006/0071950 A1 | 4/2006 | Kurzweil et al. | |
| 2006/0262352 A1 | 11/2006 | Hull et al. | |
| 2007/0230749 A1 | 10/2007 | Foss | |
| 2008/0192129 A1* | 8/2008 | Walker et al. | 348/231.2 |
| 2010/0141758 A1* | 6/2010 | Kim et al. | 348/135 |
| 2010/0274641 A1* | 10/2010 | Allen et al. | 705/13 |
| 2011/0091092 A1 | 4/2011 | Nepomniachtchi et al. | |
| 2011/0181735 A1 | 7/2011 | Goktekin et al. | |
| 2012/0020532 A1 | 1/2012 | Snow et al. | |
| 2012/0030103 A1 | 2/2012 | Hughes et al. | |
| 2012/0163664 A1 | 6/2012 | Zhu | |
| 2013/0028502 A1 | 1/2013 | Nepomniachtchi et al. | |
| 2013/0039570 A1 | 2/2013 | Vincent et al. | |

OTHER PUBLICATIONS

Hossain, et al., "Development of a recognizer for Bangla text: Present status and future challenges," Aug. 1, 2010. Character Recognition. Sciyo. pp. 82-112. XP002715748. ISBN: 978-953-307-105-3.*

(Continued)

*Primary Examiner* — Bhavesh Mehta
*Assistant Examiner* — Menatoallah Youssef
(74) *Attorney, Agent, or Firm* — Silicon Valley Patent Group LLP

(57) ABSTRACT

An electronic device and method capture multiple images of a scene of real world at a several zoom levels, the scene of real world containing text of one or more sizes. Then the electronic device and method extract from each of the multiple images, one or more text regions, followed by analyzing an attribute that is relevant to OCR in one or more versions of a first text region as extracted from one or more of the multiple images. When an attribute has a value that meets a limit of optical character recognition (OCR) in a version of the first text region, the version of the first text region is provided as input to OCR.

28 Claims, 23 Drawing Sheets

(56) References Cited

OTHER PUBLICATIONS

Chowdhury A.R., et al., "Text Detection of Two Major Indian Scripts in Natural Scene Images", Sep. 22, 2011. Camera-Based Document Analysis and Recognition. Springer Berlin Heidelberg. Berlin. Heidelberg. pp. 42-57. XP019175802. ISBN: 978-3-642-29363-4.*

Cheriet M., et al., "Character Recognition Systems. A Guide for Students and Practitioners", Jan. 1, 2007, Wiley, Hoboken, NJ, pp. I-XI,6, XP002590450, ISBN: 978-0-471-41570-1, 52 Pages.

Camera-ISP Driver, from OMAPpedia, available at http://omappedia.org/wiki/Camera-ISP_Driver, believed to be May 25, 2012, pp. 1-11.

Levin, A. et al."Deconvolution Using Natural Images Priors", believed to be published in ACM SIGGRAPH, 2007, pp. 1-3.

Matas, J. et al. "Robust Wide Baseline Stereo from Maximally Stable Extremal Regions", Proc. of British Machine Vision Conference, 2002, pp. 384-393.

Shin, H. et al. "Application of Floyd-Warshall Labelling Technique: Identification of Connected Pixel Components in Binary Image", Kangweon-Kyungki Math. Jour. 14 (2006), No. 1, pp. 47-55.

Park, J-M. et al. "Fast Connected Component Labeling Algorithm Using a Divide and Conquer Technique", believed to be published in Matrix (2000), vol. 4, Issue: 1, Publisher: Elsevier Ltd, pp. 4-7.

Jagannathan, L. et al. "Perspective Correction Methods for Camera-Based Document Analysis", believed to be published in Proceedings of First International Workshop on Camera Based Document Analysis and Recognition, Aug. 2005, Seoul, Korea, pp. 148-154.

Chowdhury A.R., et al., "Text Detection of Two Major Indian Scripts in Natural Scene Images", Sep. 22, 2011. Camera-Based Document Analysis and Recognition. Springer Berlin Heidelberg. Berlin. Heidelberg. pp. 42-57. XP019175802. ISBN: 978-3-642-29363-4 sect.1 pars. 4-6.

International Search Report and Written Opinion—PCT/US2013/071479—ISA/EPO—Mar. 27, 2014.

Liang, J., et al., "Camera-based analysis of text and documents: a survey", International Journal of Document Analysis and Recognition (IJDAR), Springer, Berlin, DE, vol. 7, No. 2-3, Jul. 1, 2005, pp. 84-104, XP019352711, ISSN: 1433-2825, DOI: 10.1007/S10032-004-0138-Z.

Mirmehdi M., et al., "Extracting Low Resolution Text with an Active Camera for OCR", Proceedings of the IX Spanish Symposium on Pattern Recognition and Image Processing, May 1, 2001. pp. 43-48. XP055108805. Retrieved from the Internet: URL:http://www.cs.bris.ac.uk/Publications/ Papers/1000564.pdf [retrieved on Mar. 19, 2014] sect.3. pars.1-4; figures 1.2.

Mori M., "Character Recognition. Baseline Detection Process ED," Aug. 1, 2010. Character Recognition. Sciyo. pp. 91-95. XP002715748. ISBN: 978-953-307-105-3 [retrieved on Aug. 17, 2010] sect. 7.2.

Zandifar A., et al., "A Video Based Interface to Textual Information for the Visually Impaired", Multimodal Interfaces. 2002. Proceedings of the Fourth IEEE International Conference on Oct. 14-16, 2002. Piscataway. NJ. USA.IEEE. Oct. 14, 2002. pp. 325-330. XP010624336. ISBN: 978-0-7695-1834-3 sect.1. 3.1. 3.2; figure 1.

\* cited by examiner

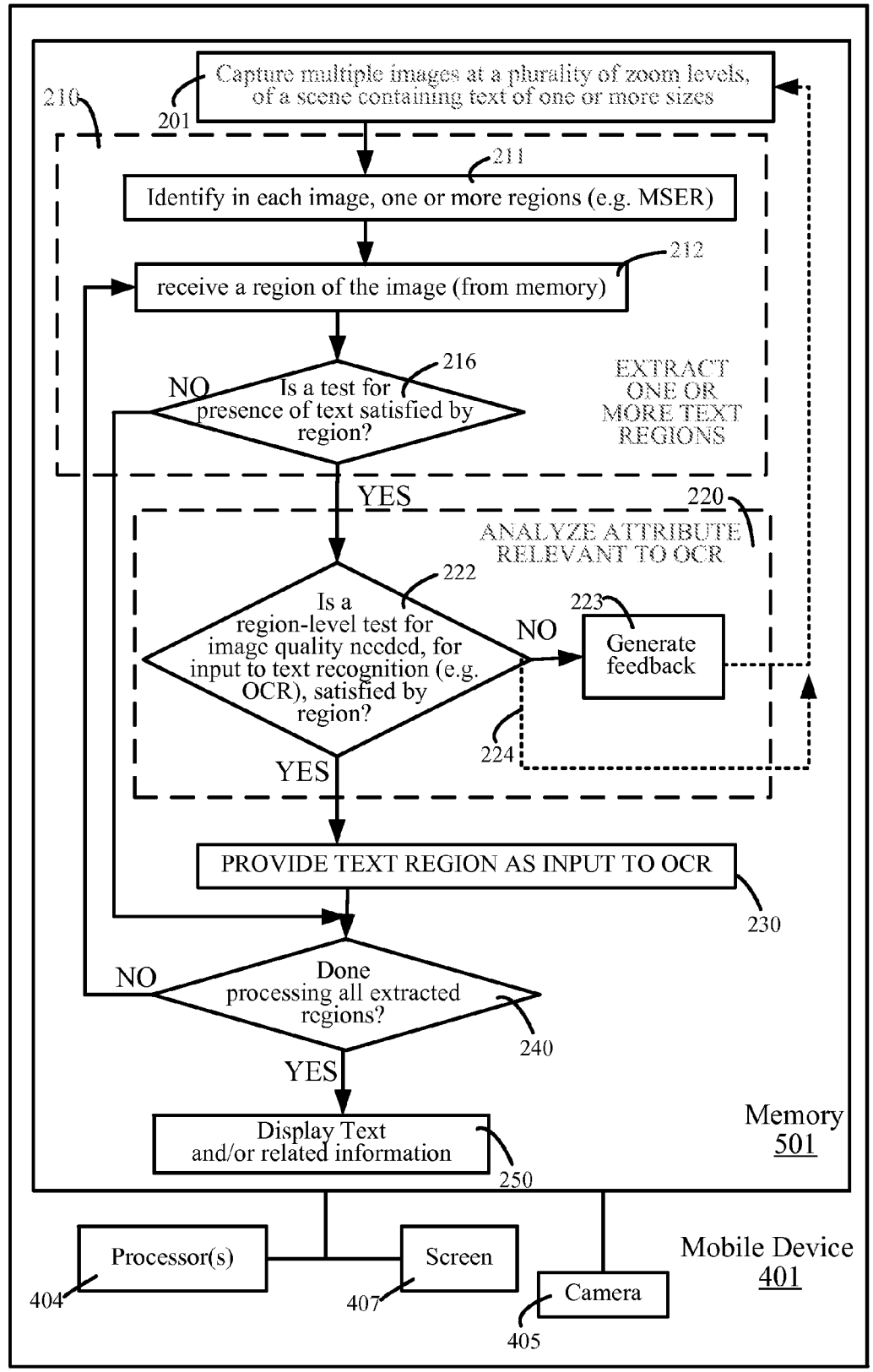

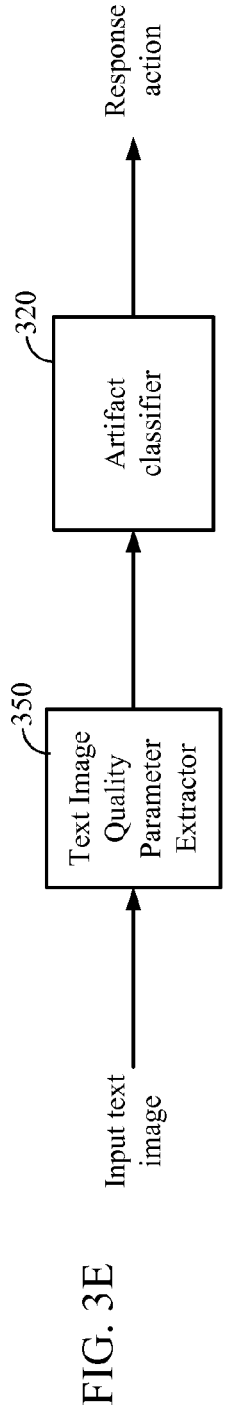

| Artifact type | Text Image Quality Parameter | Feedback target | Feedback Signal To Be Generated |
|---|---|---|---|
| Poor contrast | Local variance of luminance values | System | Contrast enhancement using histogram equalization, gamma correction based methods etc. |
| Poor resolution | Text image size | User | Ask user to zoom in or come closer to image to be captured |
| Blur | Autofocus stats (AF) | System | De-blurring algorithms for image enhancement |
| Over/under exposure | Auto exposure (AEWB) stats | User | Ask user to capture the image under different Lighting conditions or toggle flash on or off |

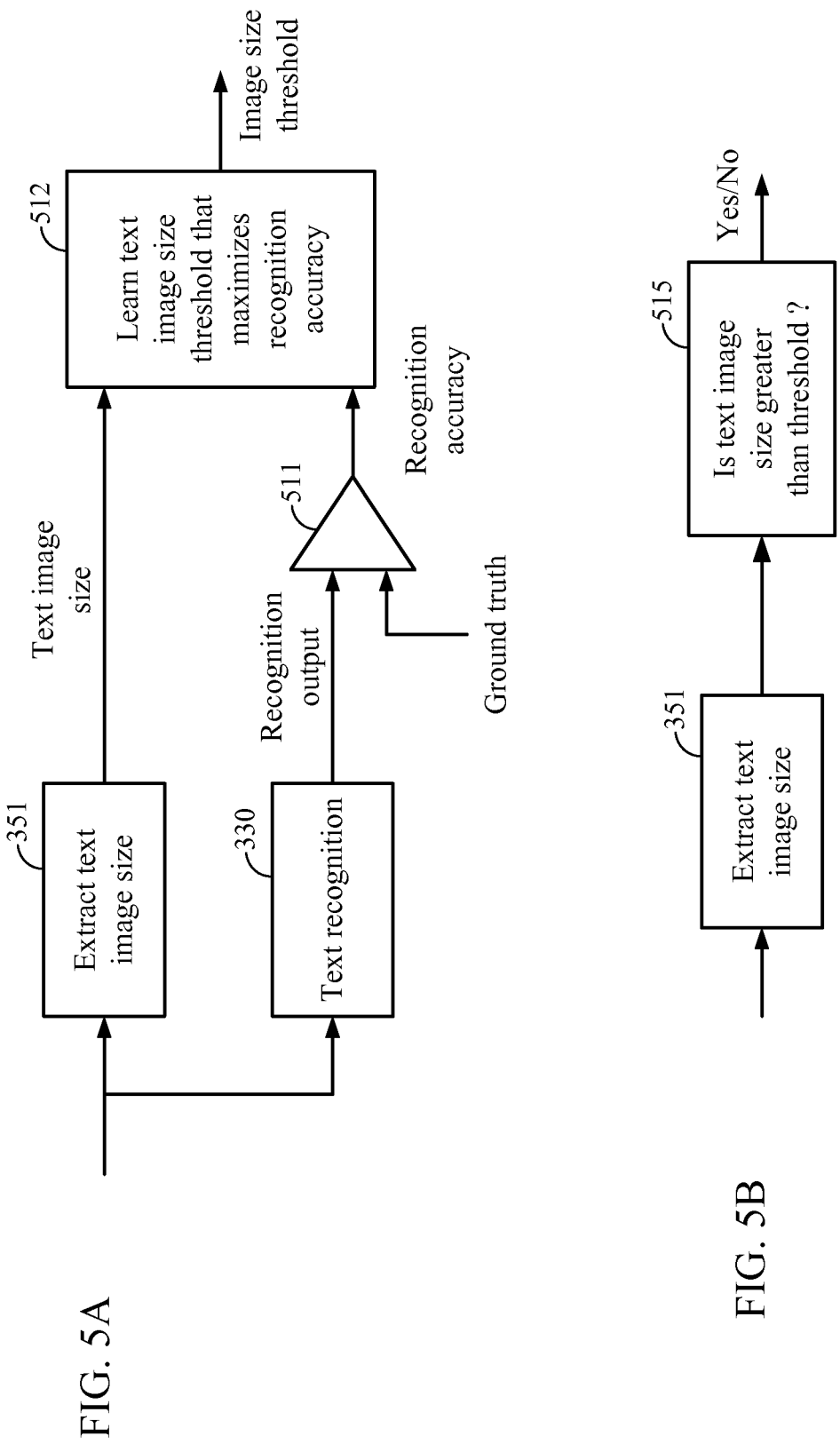

TEXT IMAGE QUALITY BASED FEEDBACK FOR IMPROVING OCR

CROSS-REFERENCE TO PRIORITY APPLICATION IN INDIA

This application claims priority to Indian Application No. 5200/CHE/2012 filed provisionally in India on 13 Dec. 2012, and entitled "TEXT IMAGE QUALITY BASED FEEDBACK FOR IMPROVING OCR", which is incorporated herein by reference in its entirety.

FIELD

This patent application relates to devices and methods for identifying in natural images or video frames, characters of text.

BACKGROUND

Identification of text regions in papers that are optically scanned (e.g. by a flatbed scanner of a photocopier) is significantly easier (e.g. due to upright orientation, large size and slow speed) than detecting regions that may contain text in scenes of the real world that may be captured in images (also called "natural images") or in video frames in real time by a handheld device (such as a smartphone) having a built-in digital camera. Specifically, optical character recognition (OCR) methods of the prior art originate in the field of document processing, wherein the document image contains a series of lines of text (e.g. 30 lines of text) of an optically scanned page in a document. Document processing techniques, although successfully used on scanned documents created by optical scanners, generate too many false positives and/or negatives so as to be impractical when used on natural images containing text in various fonts e.g. on traffic signs, store fronts, vehicle license plates, due to variations in lighting, color, tilt, focus, font, etc.

FIG. 1 illustrates a bill board in the real world scene 100 in India. A user 110 (see FIG. 1) may use a camera-equipped mobile device (such as a cellular phone) 108 to capture an image 107 (also called "natural image" or "real world image") of scene 100. Camera captured image 107 may be displayed on a screen 106 of mobile device 108. Such an image 107 (FIG. 1), if processed directly using prior art image processing techniques may result in failure to recognize one or more words in a region 103 (FIG. 1). However, use of prior art methods can cause problems when the image quality is poor for one or more reasons noted above e.g. due to variations in lighting, color, tilt, focus, font, etc.

Accordingly, there is a need to improve image quality prior to identification of characters in blocks of a region of text in a natural image or video frame, as described below.

SUMMARY

In several aspects of described embodiments, an electronic device and method use multiple images of identical text that have one or more sizes, to improve text recognition. Specifically, the electronic device and method obtain regions in a plurality of images or video frames (also called "images"), captured by a camera (e.g. in a hand-held device, such as a smartphone or tablet) at a plurality of zoom levels, and determine whether a test is satisfied by a region in an image. The test that is used by the electronic device and method is indicative of presence of text in the region, and is also called "text-presence" test. Such a text-presence test may detect, e.g. presence of a line of pixels of a common binary value representing a header-line (also called "shiro-rekha" in Devanagari), and/or variance in width of a stroke or glyph (indicative of presence of a character in the region). The "text-presence" test is applied at a stage when it is not known to the electronic device and method, if the region contains text and/or non-text. Note that the "text-presence" test in several embodiments is applied to each region individually, and therefore this test is a region-level test (and not an image-level test).

Thus, after obtaining multiple images of a scene that contains text of one or more sizes, one or more regions are automatically extracted from each of the multiple images, followed by applying a test of the type described above to identify regions that are likely to be text (also called "potential text regions" or simply "text regions"). Then the electronic device and method analyze an attribute that is relevant to OCR in one or more versions of a first text region, as extracted from one or more of multiple images, (before or after the above-described test). One example of such an attribute is height of the first text region. If the first text region in one image has a value of the attribute that is unacceptable for text recognition because an attribute of the first text region does not meet a limit of optical character recognition (OCR) (e.g. if the first text region's height is below a minimum number of pixels needed for OCR, such as 40 pixels), another image of the same scene is analyzed similarly. Note that the quality of the image checked in several embodiments is in each region individually, and hence this check is a region-level check (and not an image-level check). So, feedback that may be provided in such embodiments is at the region level (not image level).

When a first text region has a value of the attribute that is acceptable, that version of the first text region is processed further, to recognize text therein e.g. by performing OCR on each block among a sequence of blocks obtained by subdividing (e.g. by slicing) the region, and storing in memory a result of the OCR. Thereafter, the result of OCR is used to display to the user, either the recognized text or any other information obtained by use of the recognized text (e.g. translation of a word of Hindi into English).

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIG. 2 illustrates, in a high-level flow chart, acts performed by one or more processors 404 in several described embodiments, to extract one or more regions likely to be text from an image, check whether a test for image quality is satisfied by a potential text region, and generate feedback when the text region needs to be re-imaged for use in text recognition.

FIG. 3E illustrates, in a high-level block diagram, an extractor of one or more parameters indicative of quality of a text image, and an artifact classifier that are used in some embodiments of a feedback module of the type illustrated in FIG. 4A.

FIG. 3F illustrates, in a table, examples of text image quality parameters extracted by an extractor of the type illustrated in FIG. 4C and corresponding feedback that is generated in some embodiments.

FIG. 5A illustrates, in a high-level data flow diagram, training of an artifact classifier of the type illustrated in FIG. 3D.

FIG. 5B illustrates, in a high-level data flow diagram, usage of the artifact classifier of FIG. 5A, with size as text image quality parameter.

DETAILED DESCRIPTION

Figure 9:
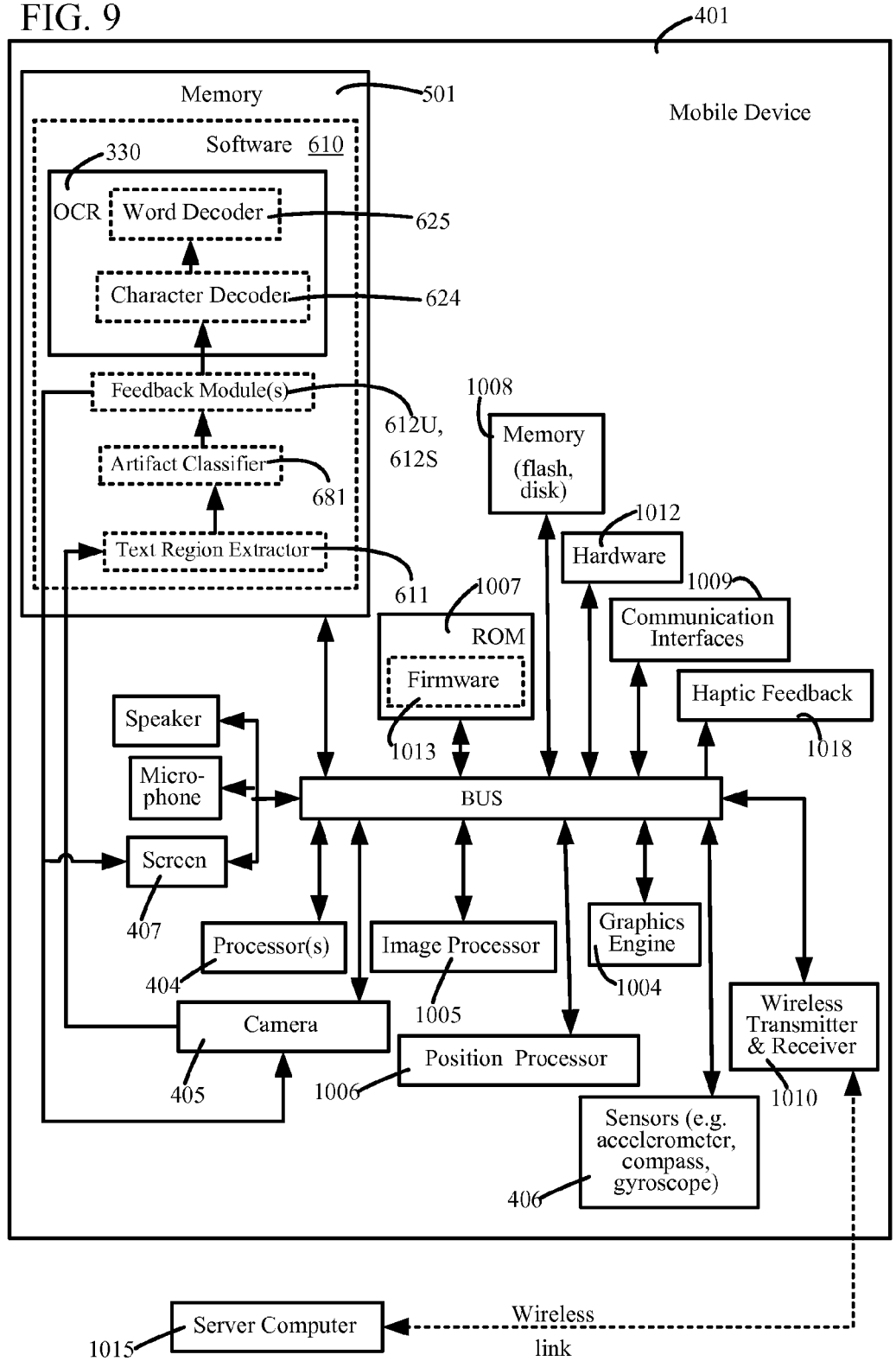
FIG. 9 illustrates, in a high-level block diagram, various components of a handheld device in some of the described embodiments.

Several operations and acts of the type described herein are implemented by one or more processors 404 included in a mobile device 401 (FIG. 9) that is capable of identifying rectangular portions (or blocks) of an image of a real world scene, followed by segmentation of each rectangular portion (or block) to form a sequence of sub-blocks and identify a character in each sub-block. Hence, mobile device 401 may include a camera 405 (FIG. 9) to generate an image or frames of a video of a scene in the real world. Mobile device 401 may further include sensors, such as accelerometers, gyroscopes, GPS sensor or the like, which may be used to assist in determining the pose (including position and orientation) of the mobile device 401 relative to a real world scene.

Those of skill in the art will appreciate that the techniques described herein can be adapted to identify portions of an image having a shape other than a rectangle, and to identify characters therein. While various examples described herein use Devanagari to illustrate certain concepts, those of skill in the art will appreciate that these concepts may be applied to languages or scripts other than Devanagari. For example, embodiments described herein may be used to identify characters in Korean, Chinese, Japanese, and/or other languages. Moreover, note that in the following description, a single processor is occasionally described for convenience, although it is to be understood that multiple processors may be used depending on the embodiment.

Accordingly, as per act 201 in FIG. 2, one or more processor(s) 404 typically obtain (e.g. from camera 405, see FIG. 9) multiple images of a scene of real world at a plurality of zoom levels (e.g. which may be predetermined). The scene of real world contains text of one or more sizes, e.g. on a billboard. Thereafter, processor(s) 404 perform an operation 210 to extract from each of the multiple images, one or more text regions. Subsequently, in an operation 220, processor(s) 404 analyze an attribute that is relevant to OCR in one or more versions of a first text region as extracted from one or more of the multiple images. When the attribute has a value that meets a limit of optical character recognition (OCR) in a version of the first text region, the processor(s) 404 provide the version of the first text region as input to OCR.

In performing the operation 210, in an act 211 the processor(s) 404 apply a predetermined method (e.g. MSER) to identify regions of pixels in the image that are connected to one another and differ from surrounding pixels in one or more properties, such as intensity and/or color. Regions of the type described above may be similar or identical to regions known in the prior art as connected components, and/or maximally stable extremal regions or MSERs. Such regions are stored in memory on completion of act 211. Depending on the embodiment, act 211 may include skew correction of a plurality of regions (including one or more text regions), followed by shiro-rekha detection in the skew-corrected regions. Detection of a shiro-rekha is followed in some embodiments by application of clustering rules to merge shiro-rekha regions with adjacent regions whose projections on an axis (e.g. x-axis) overlap.

During operation 210, in act 212, one of the extracted regions is received (e.g. from memory), followed by act 216 in which the region is tested for presence of text, e.g. by checking whether the region contains a line of pixels satisfying a test for identification of shiro-rekha (and merged with adjacent regions, if any). In act 216, the region may be fed through a verification subsystem (e.g. based on neural networks and/or stroke width), depending on the embodiment. Thus, processor(s) 404 of such embodiments may be programmed to execute first instructions included in software 610 (see FIG. 9) to verify presence of text in a region of an image of a scene of real world captured by a camera (which implements means for determining).

Each region that is found to meet a region-level test for presence of text (also called "text-presence" test) in act 216 is then stored in memory 501, followed by its use in operation 220. Specifically, operation 220 includes an act 222 to check whether the potential text region satisfies another region-level test for image quality, which is predetermined, e.g. based on a level of accuracy specified for recognition of text (OCR). Thus, one or more text regions (identified by list(s) of pixels) obtained by performance of act 211 are received (from memory 501) in act 212 and each region (identified by a corresponding list of pixels indicative of text) that satisfies the text-presence test (in act 216) is individually subject to evaluation of text image quality locally within the region in operation 220 in several embodiments. Specifically, in an act 222 in operation 220, processor(s) 404 check whether an attribute of a region (e.g. height of a bounding box defined by maxima and minima in y coordinates in a list of pixels representing the region, is greater than or equal to a preset limit, such as 40 pixels). Thus, processor(s) 404 when programmed with second instructions included in software 610, check the image quality in the region that has been identified as containing text (which implements means for checking).

After the evaluation of text image quality in act 222 (and storage of a result of the checking in memory 501), when the result indicates that an attribute of the region does meet the OCR limit used in act 222, processor(s) 404 perform an operation 230 in which the list of pixels (now known to be OCR acceptable) of the region are provided as input to OCR, which then performs automatic text recognition in the normal manner. For example, in operation 230, processor(s) 404 may invoke OCR to identify a word in the text region (e.g. by slicing a block of the selected text region into a sequence of sub-blocks, followed by using each sub-block to form a feature vector that is compared with a predetermined set of feature vectors to recognize a character). Accordingly in operation 230, processor(s) 404 of certain embodiments execute third instructions included in software 610, to provide a region as input to optical character recognition (OCR) and store a result of the optical character recognition (OCR) in memory 501, when a text-presence test is found to be satisfied by the region (in act 216) and the attribute of the region is found to meet the limit of optical character recognition (in act 222).

Figure 1:
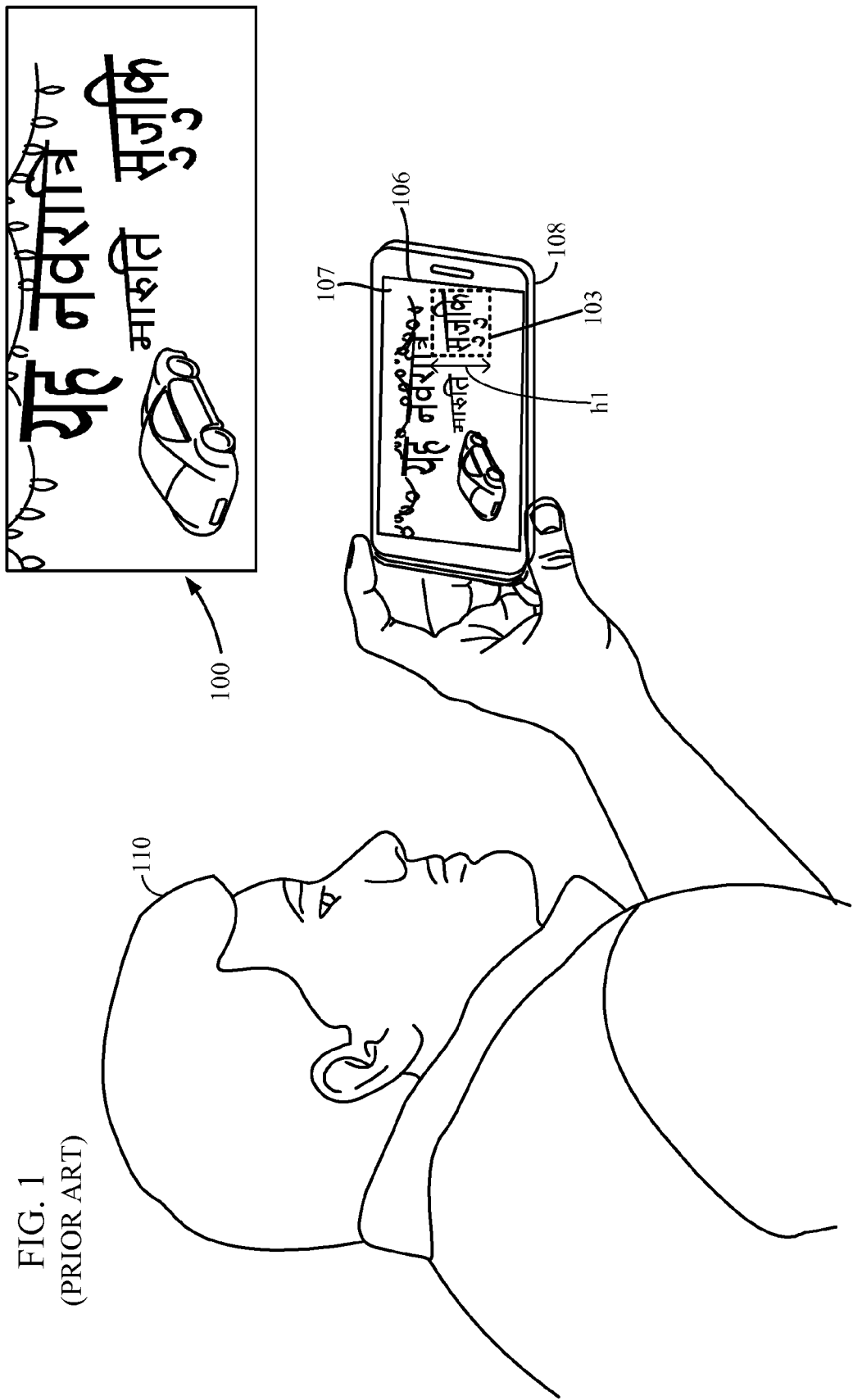
FIG. 1 illustrates a user using a camera-equipped mobile device of the prior art to capture an image of a bill-board in the real world.
Figure 11A:
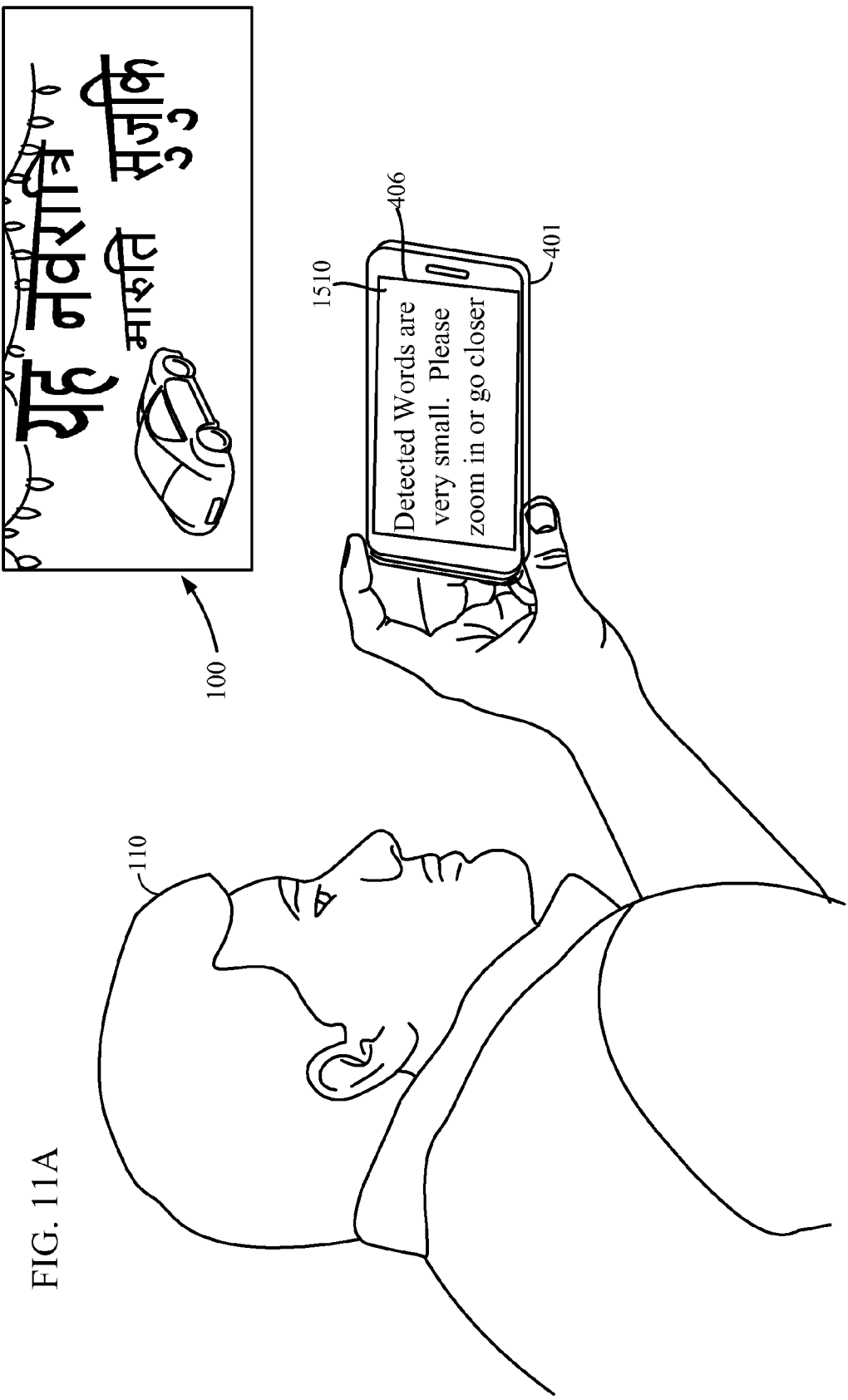
FIG. 11A illustrates a message 1510 displayed on a screen 406 of handheld device 401 in some embodiments, e.g. the sentences "Detected words are very small. Please zoom in or go closer" (which may be super-imposed on a darkened version (not shown) of a camera captured image on screen 406).
Figure 11B:
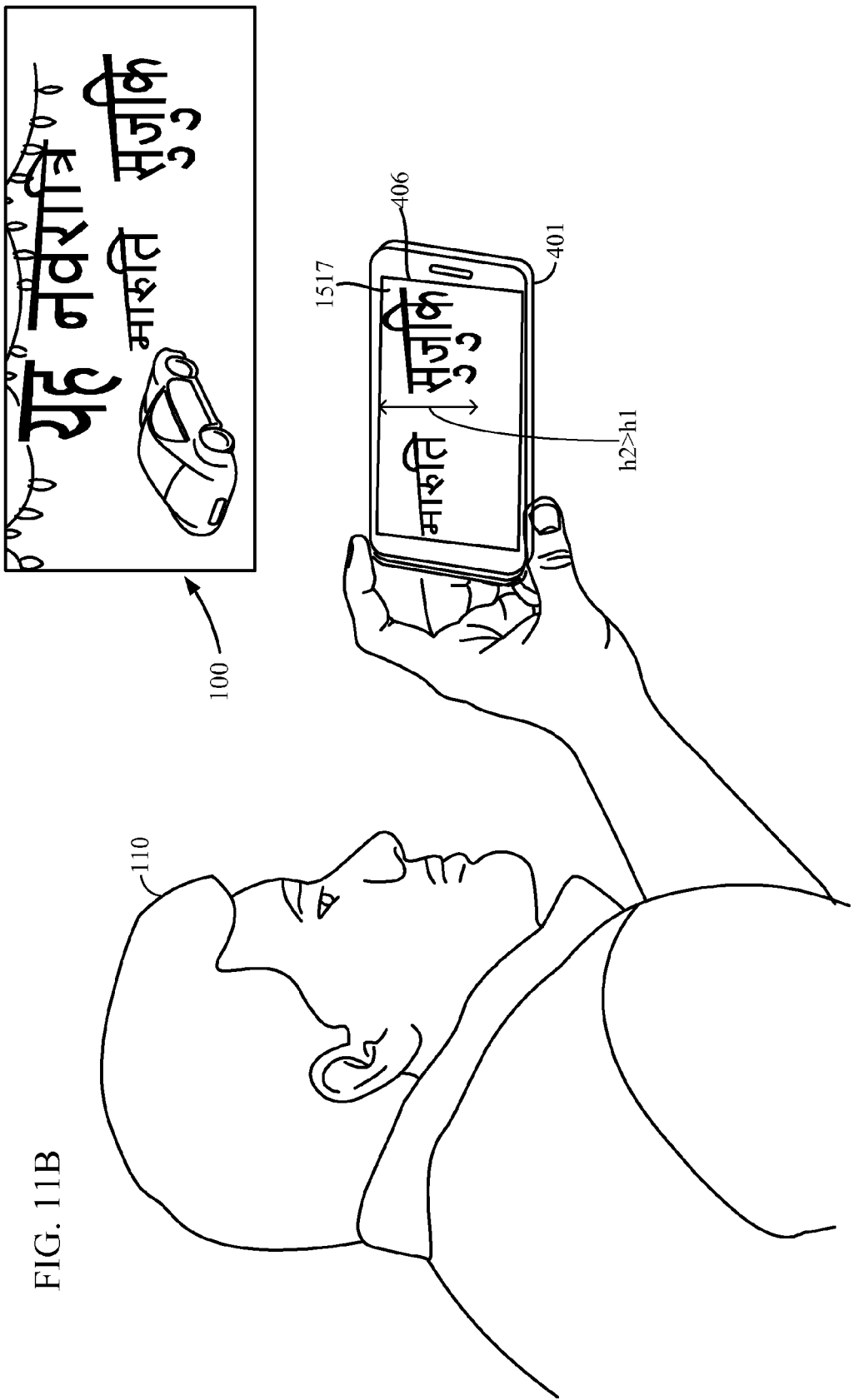
FIG. 11B illustrates a zoomed in version 1517 of image 107 (of FIG. 1) captured by camera of handheld device in some embodiments, subsequent to the message display as illustrated in FIG. 11B.
Figure 11C:
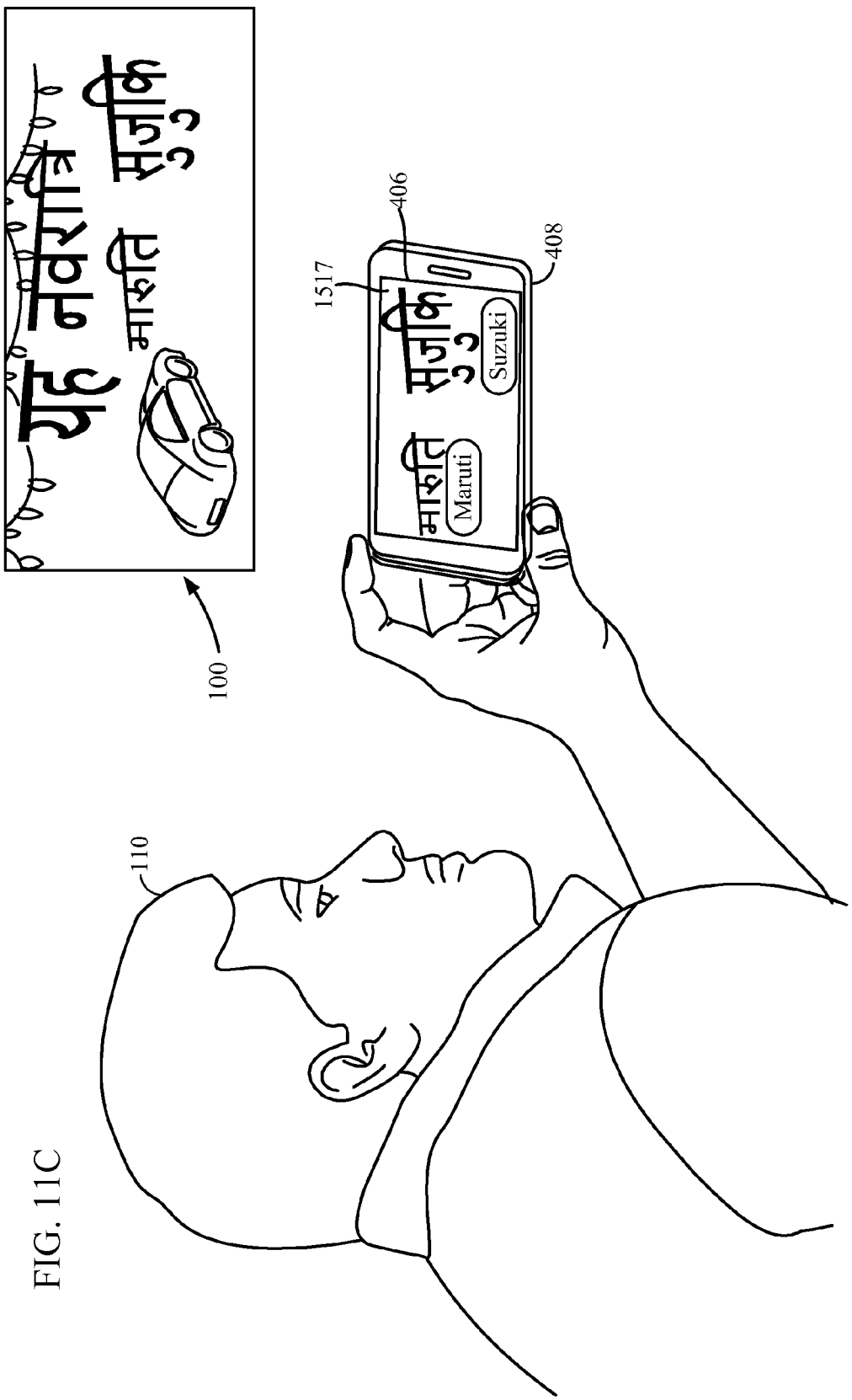
FIG. 11C illustrates display of translated words in English after the words have been recognized in version 1517 (of FIG. 11B) in some embodiments.
Figure 12A:
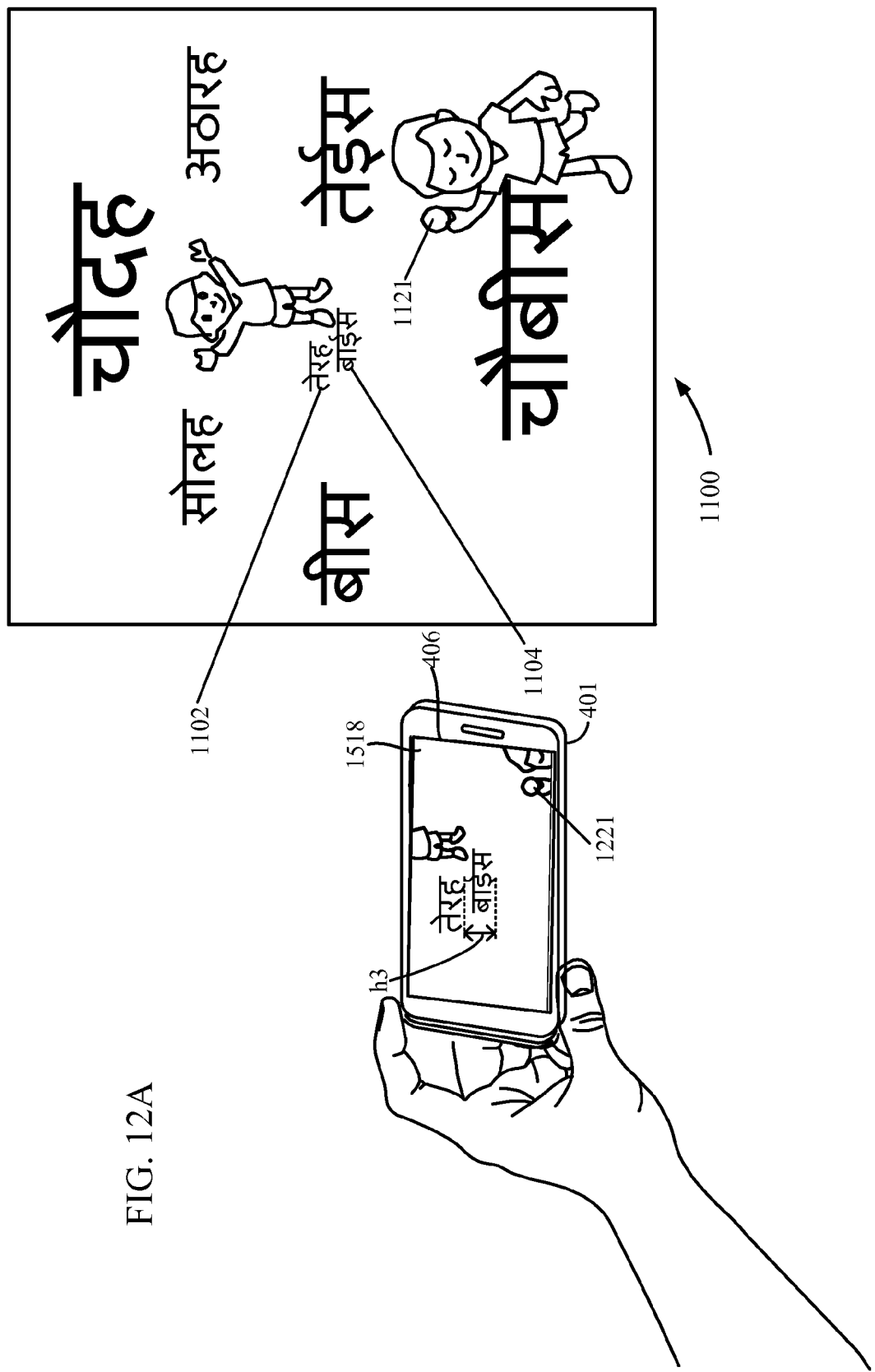
FIG. 12A illustrates the image 1518 of billboard 1100 (of FIG. 7) with text regions 1104R1 and 1102R1 in image 1518 being too small to be used in OCR.
Figure 12B:
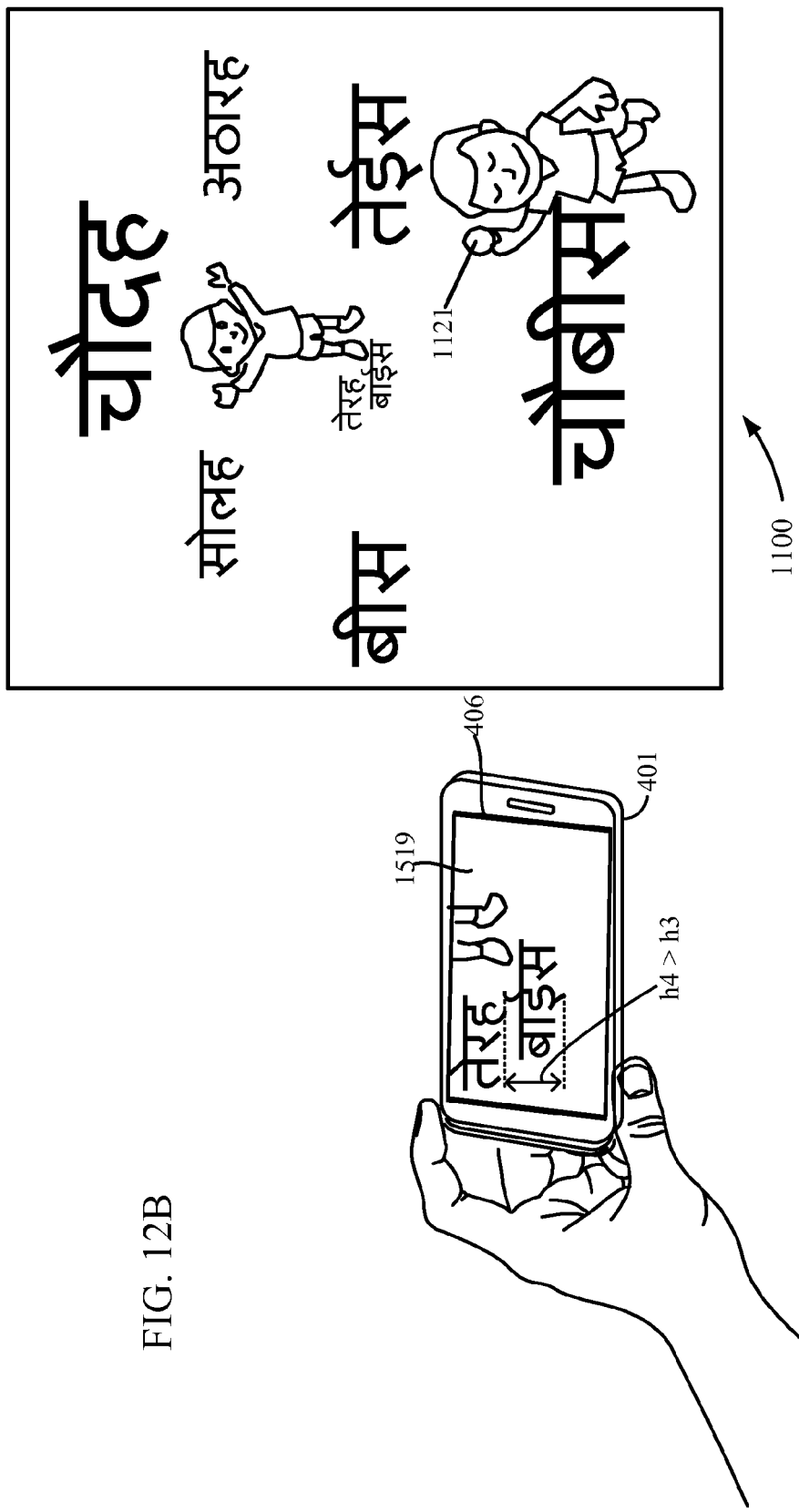
FIG. 12B illustrates a zoomed in version 1519 of billboard 1100 (of FIG. 7) that is captured in some embodiments, by automatic zooming in of the camera to obtain larger sized potential text regions 1104R2 and 1102R2 in image 1518.

If in act 222 the image quality is found to be unacceptable for text recognition (e.g. if height is below a minimum number of pixels needed for OCR), feedback is automatically generated by processor(s) 404 in act 223. Subsequently, processor(s) 404 may obtain another image of the scene (in act 201), subsequent to generation of the feedback in act 223. The just-described feedback which is generated in act 223 may be either to the user (e.g. message to move closer to text being imaged as illustrated in FIGS. 11A and 11B) or to a system (in mobile device 401) that automatically controls a camera (e.g. zoom in toward the text being imaged as illustrated in FIGS. 12A and 12B), depending on the embodiment. In FIG. 11B, the user has moved closer to the billboard sufficient for the height h2 of the word "सुजुकि" in the language Hindi in version 1517 to become larger (e.g. measured in number of pixels) than corresponding height h1 of this word in region 103 of image 107 (FIG. 1). When the image quality is acceptable, the region identified as containing pixels of text is subject to OCR. The output of OCR may be used, as illustrated in FIG. 11C to display information, e.g. the words "Maruti" and "Suzuki" in the language English when the corresponding words "मारुति" and "सुजुकि" in the language Hindi have been recognized in an enlarged version of the region captured as shown in FIG. 11B.

Similarly, in FIG. 12B, the feedback in mobile device 401 has operated an auto-zoom circuit therein to cause the billboard to be enlarged in image 1519 sufficient for the height h4 of the word "बाईस" in the language Hindi to become larger (e.g. measured in number of pixels) than corresponding height h3 of this word in the image 1518 (FIG. 12A). Note that a ball 1121 (FIG. 12A) or other feature in the scene is not imaged in image 1519 which comprises an enlarged version of a text region (also called "first text region") containing the word "बाईस" although the ball 1121 is imaged in image 1518 which comprises a smaller version of the text region containing the word "बाईस". Note that the image 1518 is a smaller version that is initially captured by mobile device 401 has text of height h3 which is too small for OCR which triggers operation of an auto-zoom circuit, that then changes the field of view as zoom is increased to capture an enlarged version as image 1519. During such operation, when the change in field of view causes a portion of text to disappear, mobile device 401 may be configured in some embodiments to notify the user to pan the camera in mobile device 401 to capture multiple images which may be stitched into a panoramic image to obtain an enlarged version, for use in identifying regions of text that have adequate image quality to be acceptable as input to OCR.

Accordingly, in act 223, processor(s) 604 of certain embodiments execute fourth instructions included in software 610 to generate feedback (which implements means for generation of feedback). To summarize, in act 223 of some embodiments, processor(s) 604 generate a feedback signal indicative of a need for camera 405 to capture a new image including the text (e.g. in order to obtain a corresponding region with an attribute improved relative to the attribute of the region that did not meet the OCR limit), when the text-presence test is found to be satisfied by the region in act 216 and the attribute of the region is found to not meet the limit of optical character recognition in act 222. As illustrated in FIG. 2 by branch 224, in certain embodiments that capture and store in memory multiple images of a scene (e.g. at different resolutions, depth of field, field of view etc), act 223 may be skipped by going directly to act 201 (described above).

Accordingly, in taking the branch 224, processor(s) 604 of certain embodiments execute fourth instructions included in software 610, to repeat the determining in act 216, the checking in act 222, and the performing in act 223 on a new region in a plurality of new regions, when a text-presence test is found to be satisfied by the region (in act 216) and the attribute of the region is found to not meet the limit of optical character recognition (in act 222).

After a sequence of characters is recognized in a text region (e.g. in operation 230) and the result of recognition stored in memory 501, processor(s) 404 may check in act 240 whether or not all regions extracted from an image have been processed in the above described manner (e.g. act 216, and operations 220 and 230), and if not return to act 212 to receive another region in which presence of text is tested, followed by text quality being evaluated, followed by text recognition. After text recognition, the result may be used in the normal manner. Specifically, in operation 250 a result of text recognition in operation 230, is used by processor(s) 404 to display on a screen 407, either the recognized text or any other information obtained by use of the recognized text.

In some embodiments of the type illustrated in FIG. 2, acts 212, 216 and operations 220, 230 and 240 may be performed iteratively in a loop. Hence, a list of coordinates of pixels in one region is recognized (OCR processed) in an iteration of the loop, independent of any other region which is similarly processed in another iteration of the loop. As will be readily apparent to the skilled artisan in view of this description, such a loop may be unrolled, and each region independently processed (e.g. in separate cores of a processor or in separate processors).

One or more processors 404 in some embodiments may be programmed to perform a number of acts or steps of the type illustrated in FIG. 3A as follows. Specifically, operation 210 (FIG. 2) may be implemented by performing the acts 211, 212 and 216 as follows. In act 211, a portion of an image (such as image 107) may be identified by such a processor 404 using any method that identifies from image 107, one or more regions (also called "blobs") that differ from surrounding pixels in one or more properties, such as intensity and/or color. Regions of the type described above may be similar or identical to regions known in the prior art as connected components, and/or maximally stable extremal regions or MSERs.

The regions are normally identified as rectangular portions, such as region 103 in FIG. 1, by processor(s) 404 identifying a bounding box that tightly fits a region identified by use of any known method that identifies MSERs or identifies connected components. A tight fitting bounding box can be identified by processor(s) 404 in the normal manner, using maximum and minimum coordinates of such a region. The bounding box may be then used by processor(s) 404 to compute an indicator of skew locally within the region. One or more such skew indicator(s) may be used by processor(s) 404 (in act 213), to determine the presence of skew globally in the image 107 in its entirety, followed by correction of the skew (if present).

Thereafter, in act 214, some embodiments identify one or more rectangular regions that are likely to be text, by applying one or more tests that determine presence of text. For example, processor(s) 404 may check for presence of a line of pixels within a top one-third of the rectangular region, in act 214 (which may indicate presence of a shiro-rekha in Devanagari text). Hence, in some embodiments, act 214 may check for presence in the top one-third, of a peak in a histogram of pixel intensities, e.g. by identifying a row that contains a maximum number of pixels binarized to value 1, across all rows of the rectangular region.

Subsequently, in act 215 (FIG. 3A), two or more regions may be clustered by processor(s) 404, based on a test of geometry (e.g. when projections of two regions on an axis (such as the x-axis) overlap and the two regions are adjacent to one another with no other region intervening there-between). The just-described clustering enables various modifiers (e.g. upper maatras and/or lower maatras) to be included with the specific characters that are modified by the modifiers (e.g. by being appending thereto). Thereafter, processor(s) 404 perform an act 216 (FIG. 3A) to classify the regions (whether or not merged) as text or non-text, e.g. by use of a neural network and/or based on stroke width, which may be implemented in a text verification block 250 of the type illustrated in FIG. 4A.

Figure 3A:
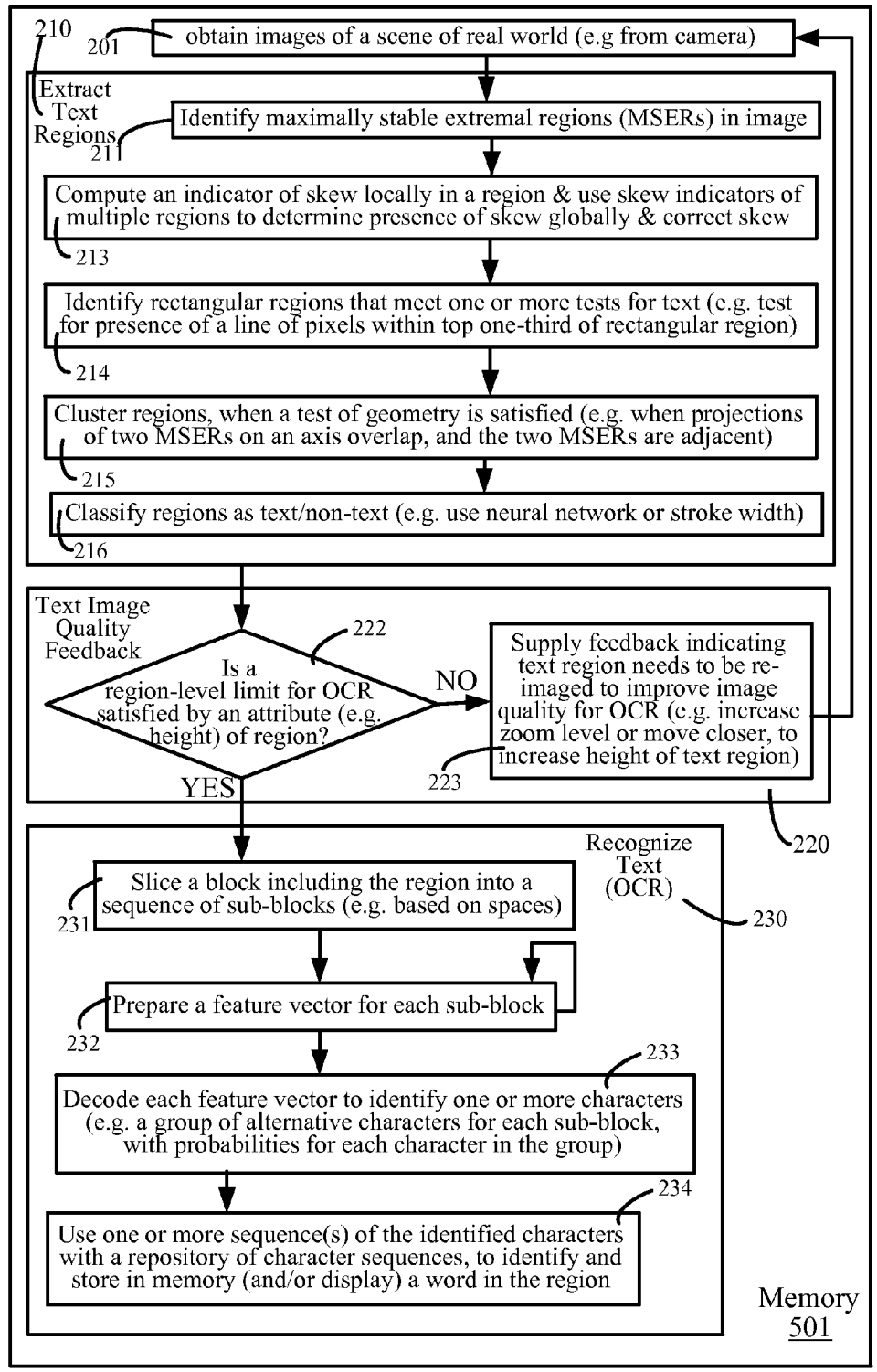
FIG. 3A illustrates, in an intermediate-level flow chart, acts performed by one or more processors 404 in some embodiments of the type illustrated in FIG. 2.
Figure 3B:
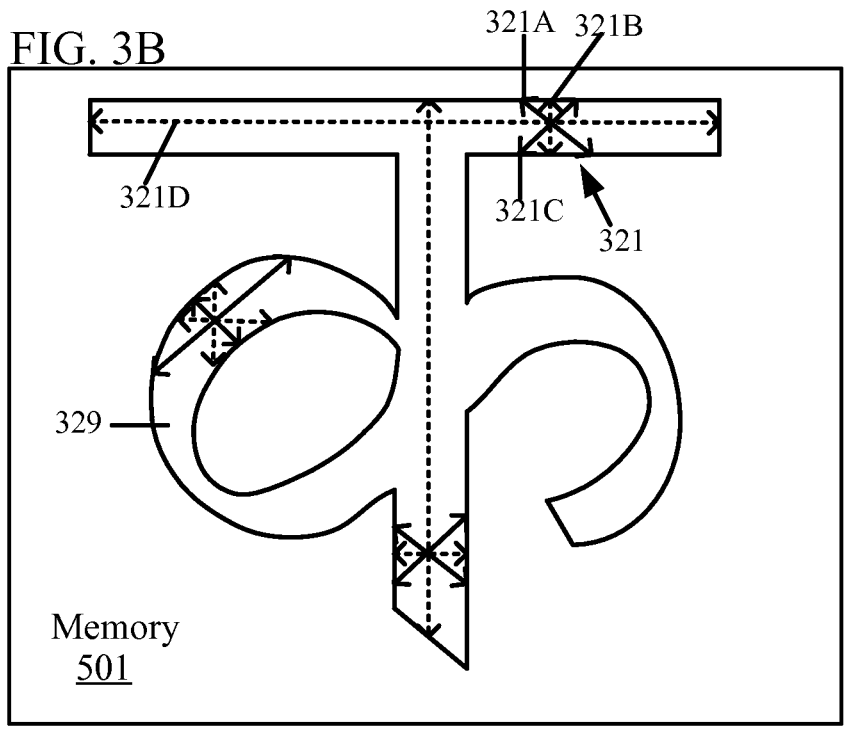
FIGS. 3B and 3C illustrate computation of stroke width that is used in some embodiments to verify a region in an image, as containing text.
Figure 3C:
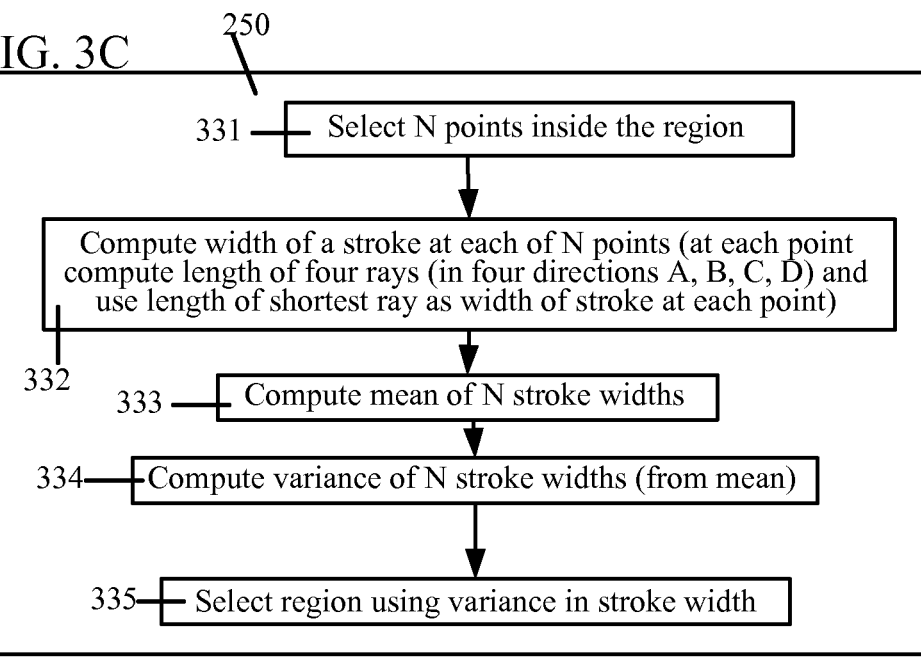

In some embodiments, act 216 to verify that a region 329 (FIG. 3B) is text is implemented in text verification block 250 by computing stroke width multiple times (in a character), and checking on its variance, as illustrated by acts 331-335 in FIG. 3C. FIG. 3B illustrates determination of stroke width, by selecting a fixed number of points (e.g. 3 points) within a region 329 (identified by use, e.g. of MSER) and computing a dimension of the region 329 in each of a predetermined number of directions (e.g. 4 directions), followed by selecting the smallest dimension computed (e.g. among the 4 directions) as the stroke width. The specific manner in which stroke width in some embodiments is illustrated by the method of FIG. 3C, described next.

Specifically, in some illustrative embodiments, processor(s) 404 perform acts 331-333 (FIG. 3C) to compute stroke width as follows. In act 331, mobile device 401 selects N points inside a region 329 (FIG. 3B), such as the point 321. Next, in act 332 mobile device 401 computes width of a stroke at each of the N points. For example, at point 321, processor(s) 404 compute the length of four rays 321A, 321B, 321C, and 321D and then use the length of shortest ray 321B as width of the stroke at point 321. Then, in act 333, mobile device 401 computes the mean of N such stroke widths for the region 329. Finally, in act 334, mobile device 401 computes standard deviation and/or variance of the N stroke widths (from the mean). Then, in act 335 mobile device 401 checks if the variance is less than a predetermined threshold, and if so, the region's classification as text has been verified.

Operation 220 (FIG. 3A) of some embodiments is implemented by a text image quality feedback module 300 (FIG. 3D) that includes a selector 310 to select one of the two inputs, wherein the first input is from a text verification block 250 (see FIG. 3B) and the second input is from a system (in mobile device 401) that automatically corrects an artifact. Initially, the first input is selected by selector 310 which receives two versions of the same region namely a grey-scale version and a binarized version. When a region is found by an artifact classifier 320 to have no artifacts, the binarized version of the text region is supplied to OCR module 330 for text recognition therein. However, if the text region is found by artifact classifier 320 to have some artifact (as illustrated by the rows in a table shown in FIG. 3F), then feedback is generated, either to the user or to a system (in mobile device 401) that operates the camera. Artifact classifier 320 may be implemented as a neural network, with training on one or more attributes of regions that are acceptable or not acceptable by OCR.

In some embodiments, text image quality feedback module 300 (FIG. 3D) includes a text image quality parameter extractor 350 (FIG. 3E) that extracts one or more parameters indicative of quality of an image locally within a region (such as height of the region). Text image quality feedback module 300 of such embodiments also includes artifact classifier 320 that uses the parameter values generated by text image quality parameter extractor 350 and in turn generates appropriate feedback of the type illustrated in a table shown in FIG. 3F. Auto-focus and/or auto-exposure statistics may be generated as described at, for example, http://omappedia.org/wiki/Camera-ISP_Driver which is incorporated by reference herein in its entirety. Moreover, de-blurring algorithms are used as described in, for example, the following article which is incorporated by reference herein in its entirety: A. Levin, R. Fergus, F. Durand, and W. T. Freeman, "Deconvolution using natural image priors," ACM SIGGRAPH, 2007.

Figure 3D:
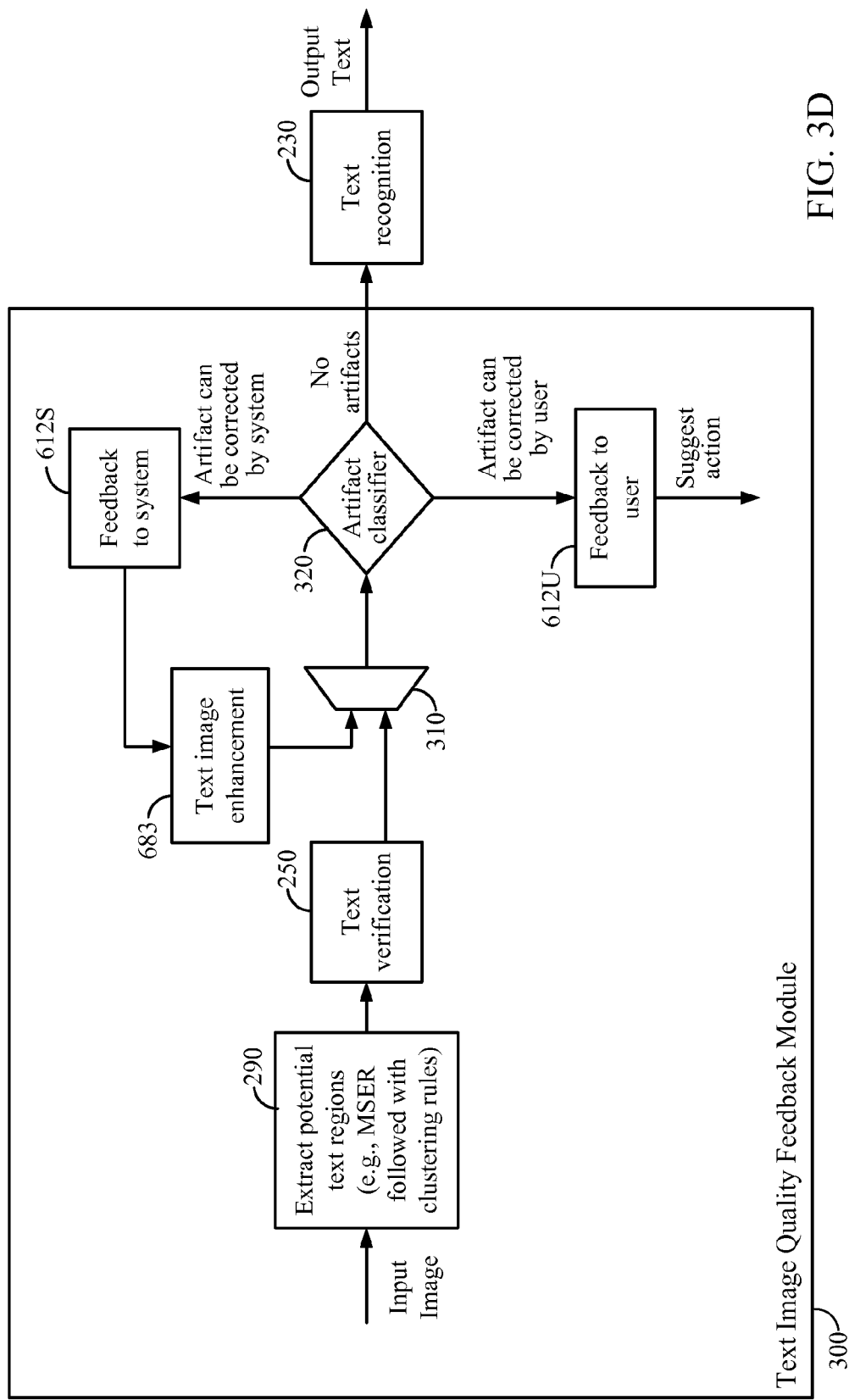
FIG. 3D illustrates a text image quality feedback module that performs operation 220 of FIG. 3A.

In several illustrative embodiments, text regions extracted by the text region extractor 290 of FIG. 3D (which performs operation 210 described above) are found to be too small in dimensions to be properly recognized by the text recognition subsystem of mobile device 401. For example, in some embodiments, the mobile device 401 has a lower limit of 40 pixels height for a text region to be subject to recognition, and image regions with height below this limit result in poor performance. Hence, the artifact classifier 320 of FIG. 3D may determine the regions 1102 and 1104 on bill board 1100 (FIG. 7) are to be re-imaged (e.g. due to height being less than 40 pixels).

Figure 7:
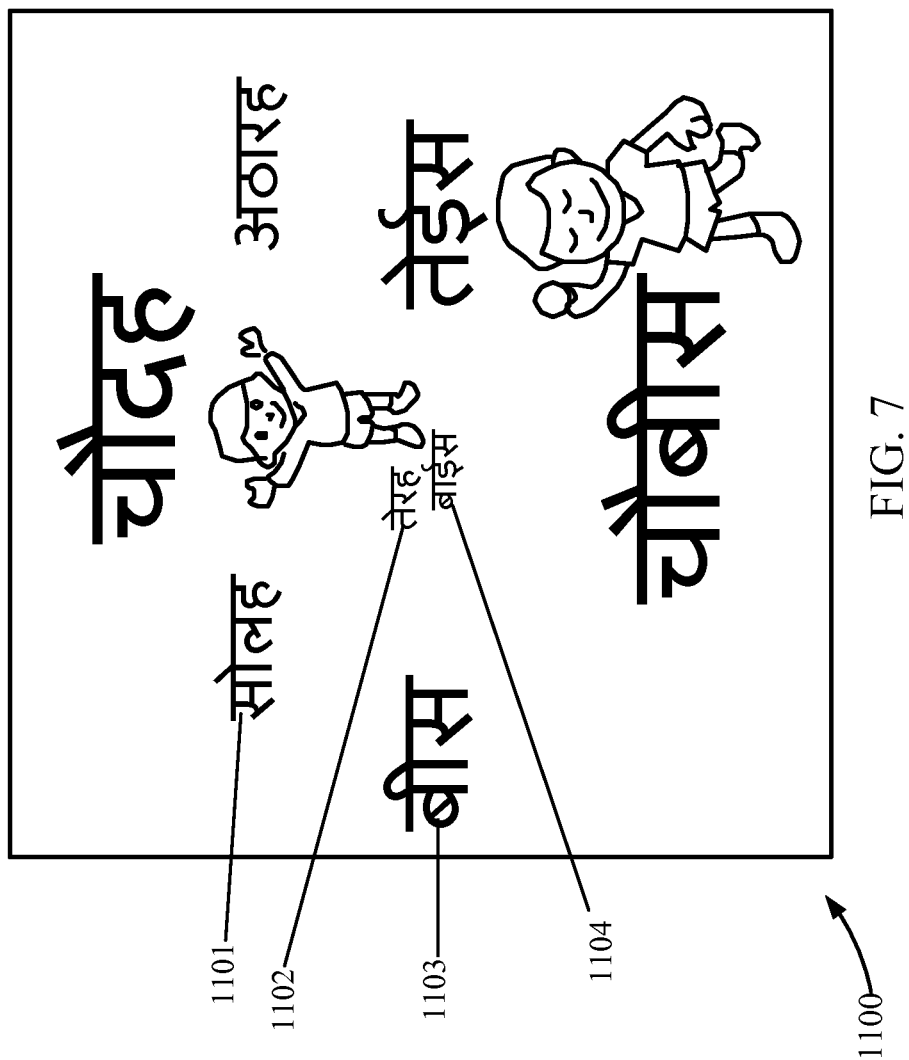
FIG. 7 illustrates a billboard 1100 in real world (prior art) wherein text regions 1101, 1102, 1103 and 1104 have different sizes at different locations.

In some such embodiments, artifact classifier 320 may generate a feedback message to the user, asking the user to move closer to the text. In other such embodiments, artifact classifier 320 may generate a signal that automatically operates a camera, to zoom in to bill board 1100 (FIG. 7). The amount of zoom may be automatically calculated by such an artifact classifier 320 based on scaling up a current height of the text region to reach a predetermined number of pixels (e.g. if text height is 30 pixels, then scaling up by 1.34 reaches 40 pixel height) and this scaling up factor is used to zoom in (although note that the field of view reduces). When a text region (e.g. region 1101) that was previously present is no longer present in an image subsequent to auto-zooming (e.g. to capture the region 1104), then artifact classifier 320 of some embodiments additionally generates feedback to the user to physically move closer to the image. In some embodiments, the text regions extracted from different images, are used together, to recognize text in a scene (FIG. 7), which is common across images obtained in response to one or more feedback(s) by the artifact classifier 320.

After performance of operation 220 (FIG. 3A), an operation 230 is performed (by an OCR module 330) to recognize text in a text region as per the yes branch out of act 221 (FIG. 3A). Specifically, processor(s) 404 obtain a sequence of sub-blocks from such a text region in the normal manner, e.g. by subdividing (or slicing) in operation 231 (FIG. 3A). Sub-blocks may be sliced from a region using any known method e.g. based on height of the text region, and a predetermined aspect ratio of characters and/or based on occurrence of spaces outside the boundary of pixels identified as forming an MSER region but within the text region. The result of slicing in act 231 (FIG. 3A) is a sequence of sub-blocks, and each sub-block (or slice of the block) is then subject to optical character recognition (OCR) as described below.

Specifically, in an act 232 (FIG. 3A), processor(s) 404 form a feature vector for each sub-bock (or slice) of the text region, followed by act 233. A specific feature vector that is formed in act 232 can be different, depending on the embodiment. In act 233, processor(s) 404 decode the feature vector, by comparison to corresponding feature vectors of letters of a predetermined alphabet, to identify one or more characters (e.g. alternative characters for each sub-block, with a probability of each character). Subsequently, in act 234, processor(s) 404 use one or more sequences of the identified characters with a repository of character sequences, to identify and store in memory (and/or display on a screen) a word identified as being present in the text region.

Several embodiments of a mobile device 401 are implemented as illustrated in one or more of FIGS. 4A and 4B described next. In several embodiments, mobile device 401 includes a plurality of instructions in software 610 in memory 501 that when executed by processor(s) 404 implements a text region extractor 611, e.g. by performing an operation 410 (FIG. 4A) wherein one or more regions are extracted from an image, e.g. based on variation in intensities of pixels in the image, followed by operations 420, 430, 440, 450, 452 and 460 as described below. In operation 410, pixels in an image may be identified in a set (which may be implemented as a list) that in turn identifies a region $Q_i$ which includes a local extrema of intensity (such as local maxima or local minima) in the image. Such a region $Q_i$ may be identified in operation 510 as being maximally stable relative to one or more intensities in a range $i-\Delta$ to $i+\Delta$, each intensity i being used as a threshold (with $\Delta$ being a parameter input to an MSER method) in comparisons with intensities of a plurality of pixels included in region $Q_i$ to identify respective regions $Q_{i-\Delta}$ and $Q_{i+\Delta}$.

Such a region (which may constitute a "connected component") may be identified in operation 410 (FIG. 4A) by use of any MSER method, e.g. as described in an article entitled "Robust Wide Baseline Stereo from Maximally Stable Extremal Regions" by J. Matas, O. Chum, M. Urban, and T. Pajdla, BMVC 2002, 10 pages that is incorporated by reference herein in its entirety. Other methods can be used to perform connected component analysis and identification of regions in operation 510 e.g. as described in an article entitled "Application of Floyd-Warshall Labelling Technique: Identification of Connected Pixel Components In Binary Image" by Hyunkyung Shin and Joong Sang Shin, published in Kangweon-Kyungki Math. Jour. 14 (2006), No. 1, pp. 47-55 that is incorporated by reference herein in its entirety, or as described in an article entitled "Fast Connected Component Labeling Algorithm Using A Divide and Conquer Technique" by Jung-Me Park, Carl G. Looney and Hui-Chuan Chen, published Matrix (2000), Volume: 4, Issue: 1, Publisher: Elsevier Ltd, pages 4-7 that is also incorporated by reference herein in its entirety.

After one or more regions in the image are identified, text region extractor 611 in mobile device 401 of some embodiments performs skew presence detection in an operation 420 (see FIG. 4A), followed by skew correction. Operation 420 is performed prior to classification of pixels into text or non-text in operation 460 (described below). Moreover, operation 420 is performed prior to merging of regions that are adjacent to one another (e.g. in operation 440), and also prior to binarization (e.g. in operation 450). During operation 420, mobile device 401 calculates a value of an indicator of skew locally, in a specific region. Some embodiments of processor(s) 404 compute a value of the indicator of skew for each region $Q_i$, by using (a) an area of the rectangle that tightly fits the region $Q_i$ (also called "minimum bounding rectangle") and (b) a count of pixels in the region $Q_i$ to obtain a metric $M_i$, which may be used to determine skew of the region i. In several such embodiments, metric $M_i$ is compared with a threshold t1 to determine whether or not skew in the region $Q_i$ is acceptable or not (e.g. not acceptable when skew angle of a region is greater than ±5 degrees), thereby to obtain a binary-valued indicator of skew in each region $Q_i$. In other such embodiments, the metric $M_i$ is directly used, as a real-valued indicator of skew in each region i.

A value of an indicator of skew that is computed in operation 420 for each region is stored either individually (for each region) or in aggregate (across multiple regions), at a specific location in memory 501. Some embodiments of mobile device 401 increment in the memory 501 a skew count for the entire image each time a region is marked as skew-present. Other embodiments label each region individually in memory as either skew-present or skew-absent. It is not known at this stage (e.g. in operation 420) whether or not a feature formed by the region is text or non-text, although a value of an indicator of skew is being determined for the region. In several aspects, mobile device 401 applies a predetermined test to multiple values of the indicator of skew (and/or the metric of skew) that are computed for multiple regions respectively in the image, and the multiple values are used to determine whether skew is present globally, in the image as a whole. Certain embodiments of operation 420 may use statistical methods to compute mean or median of the multiple values, followed by filtering outliers among the multiple values, followed by re-computation of mean or median of the filtered values and comparison to a threshold (e.g. greater than ±5 degrees) to determine whether or not skew in the image as a whole is acceptable.

After operation 420, when skew is found to be acceptable across multiple regions of an image, text region extractor 611 in mobile device 401 of some embodiments performs an operation 430 (FIG. 4A) which checks for presence of a line of pixels of a common binary value, and thereafter performs an operation 440 that uses predetermined rules to merge regions that are adjacent to one another, when one of the regions satisfies the test for line presence (in operation 530). Operation 440 is followed by operation 450 in a binarization module that binarizes bounding boxes of regions (merged or unmerged) resulting from operation 540.

Operation 450 is followed in text region extractor 611 by an operation 452 (FIG. 4A) to verify that a line of pixels of a common binary value is present in the binarized block of a region (whether or not merged), followed by operation 460 (FIG. 4A) to classify binarized blocks as text or non-text (e.g. by use of a neural network and/or based on variance in stroke width). Operation 452 can be implemented in a verification module differently in different embodiments of text region extractor 611. After classification in operation 460, one or more blocks that are classified as text are supplied by text region extractor 611 to selector 310, illustrated in FIG. 3D.

Recognition of a word of text in a region of an image is performed in some embodiments by an OCR module 330 of the type illustrated in FIG. 4B, described next. Specifically, several embodiments of mobile device 401 include modules 621, 622, 623, 624, 625, 628 and 629 (FIG. 4B) that implement logic to perform a method of the type described herein. Such modules may be implemented either in hardware or in software executed by processor 604 or in a combination thereof, as described below in reference to FIG. 4B. Specifically, mobile device 401 of some embodiments includes character segmentation logic in module 622 (FIG. 4B) that slices a block of a text region (with the block being identified by a bounding box thereof), based on language specific rules in module 621 in a memory 501 of mobile device 401.

A sequence of sub-blocks generated by module 622 is input to a feature representation logic in module 623 (FIG. 4B) that prepares a feature vector of N elements, for each block in the sequence. Depending on the embodiment, any type of feature vector may be used by module 623 to represent pixels in each sub-block (containing pixels indicative of a character of text to be OCRed, including a shiro-rekha and any upper maatra that may be present as shown in FIG. 4B for the letter से ).

Some embodiments may subdivide each sub-block containing pixels of a character into a predetermined number of sub-sub-blocks, e.g. 2×2 or 4 sub-sub-blocks, 4×4 or 16 sub-sub-blocks or even 5×4 or 20 sub-sub-blocks. Then, two dimensions are formed for a feature vector to keep count of black-to-white and white-to-black transitions in the horizontal direction (e.g. left to right) along a row of pixels in each sub-sub-block of a sub-block, and two additional dimensions are formed for the feature vector to keep count of black-to-white and white-to-black transitions in the vertical direction (e.g. bottom to top) along a column of the sub-block.

Depending on the embodiment, additional counts that may be included in such a feature vector are counts of absence of changes in intensity values of pixels. For example, such additional counts may keep track of number of occurrences black-to-black (i.e. no change) intensity values and number of occurrences of white-to-white (also no change) intensity values in the horizontal direction (e.g. left to right) along a row of pixels in the sub-block. Similarly, number of occurrences of black-to-black intensity values and number of occurrences of white-to-white (also no change) intensity values in the vertical direction (e.g. top to bottom) along a column of pixels in the sub-block.

One or more feature vectors formed by module 623 may be used in some embodiments to identify multiple versions of a specific text region (e.g. such as text region 1102 containing the word "बाईस" on billboard 1100 in FIG. 12A) in corresponding multiple images of the same scene (e.g. in image 1518 in FIG. 12A and in image 1519 in FIG. 12B). As the word "बाईस" in image 1518 in FIG. 12A has a height h3 different from height h4 of the same word "बाईस" in image 1519 in FIG. 12B, the feature vector used to correlate text regions across images is scale invariant.

In several embodiments of mobile device 401 that perform such correlation (e.g. using keypoint locations and/or mappoint locations in images), when an attribute has a value that does not meet a limit of optical character recognition (OCR) in a version of a first text region, mobile device 401 may automatically analyze additional versions of the first text region extracted from concurrently or successively captured images of the type described herein. Moreover, certain embodiments of mobile device 401 analyze an attribute that is relevant to OCR in one or more versions of a second text region as extracted from one or more images, and when the attribute has a value that meets a limit of optical character recognition (OCR) in a version of the second text region in a specific image, mobile device 401 provides the second text region extracted from the specific image as input to OCR. This process may be continued with one or more additional regions of text extracted from the multiple images until a version of each of the identified text regions has been input to OCR for recognizing the text contained therein. In several such embodiments, such a mobile device 401 may additionally or alternatively output text recognized in the first text region and in the second text region.

The feature vectors formed by module 623 of some embodiments are input to a multi-stage character decoder 624 (FIG. 4B) that generates as its output a group of characters as alternatives to one another, optionally with confidence measures for each character in the group as representing a character of text in a specific sub-block. In some embodiments of the type described below, multi-stage character decoder 624 includes a first stage that searches among a set of predetermined feature vectors and a second stage that searches, for each identified character, a corresponding set of characters that are known to be incorrectly identified to be one another (called "confusion set", which includes the identified character). The just-described set of predetermined feature vectors and the just-described confusion set are stored in a database as two portions of information 628 that is used by multi-stage character decoder 624 in two stages. Depending on the embodiment, either or both portions of the just-described information may be changed by feedback from the word decoder 625.

In several embodiments, information 628 includes as a first portion used in the first stage, a tree whose leaf nodes hold feature vectors, and the tree is traversed in the first stage e.g. by comparing the feature vector of a sub-block with corresponding feature vectors at one or more intermediate nodes by use of Euclidean distance, to identify a specific leaf node. In certain embodiments, a leaf node in the tree includes a mean of feature vectors that are representative of a character (e.g. a mean over multiple shapes in different fonts of a commonly-occurring character), as well as one or more feature vectors that are selected for being outliers among the feature vectors representative of the character. In some embodiments, information 628 includes as a second portion used in the second stage, a set of weights that identify elements of the feature vector known to be sufficient to distinguish between characters in the confusion set. Each group of characters identified by multi-stage character decoder 624 for a corresponding sub-block are input to a word decoder 625 (FIG. 4B) that collects such groups for all sub-blocks in a block of the text region, and then outputs a word that has been selected from a dictionary 629. Dictionary 629 of some embodiments holds a predetermined set of words and/or sequences of characters that have been obtained (e.g. from a prior art dictionary) by removing accent marks.

FIG. 5A illustrates, in a high-level data flow diagram, training of an artifact classifier of the type illustrated in FIG. 3D to determine text size that maximizes recognition performance, by off-line computation. Specifically, text image quality parameter extractor 350 of FIG. 3E is used during design time, to extract a height (or text size) of a region in a sample image. Moreover, OCR module 330 is used during design time, to perform text recognition on the same region of the sample image. The output of the OCR module 330 is compared with ground truth which identifies a specific word of text in the region used to create the sample image, by logic 511 (which may be implemented as hardware or software or a combination), to determine recognition accuracy. The recognition accuracy and the height (or text size) is used by logic 512 to identify a limit of OCR (at the region level). Thereafter, during run time, as illustrated in FIG. 5B, a limit generated by logic 512 is used in logic 515 to determine whether or not the region is to be input to OCR (as per act 222 described above).

Figure 6A:
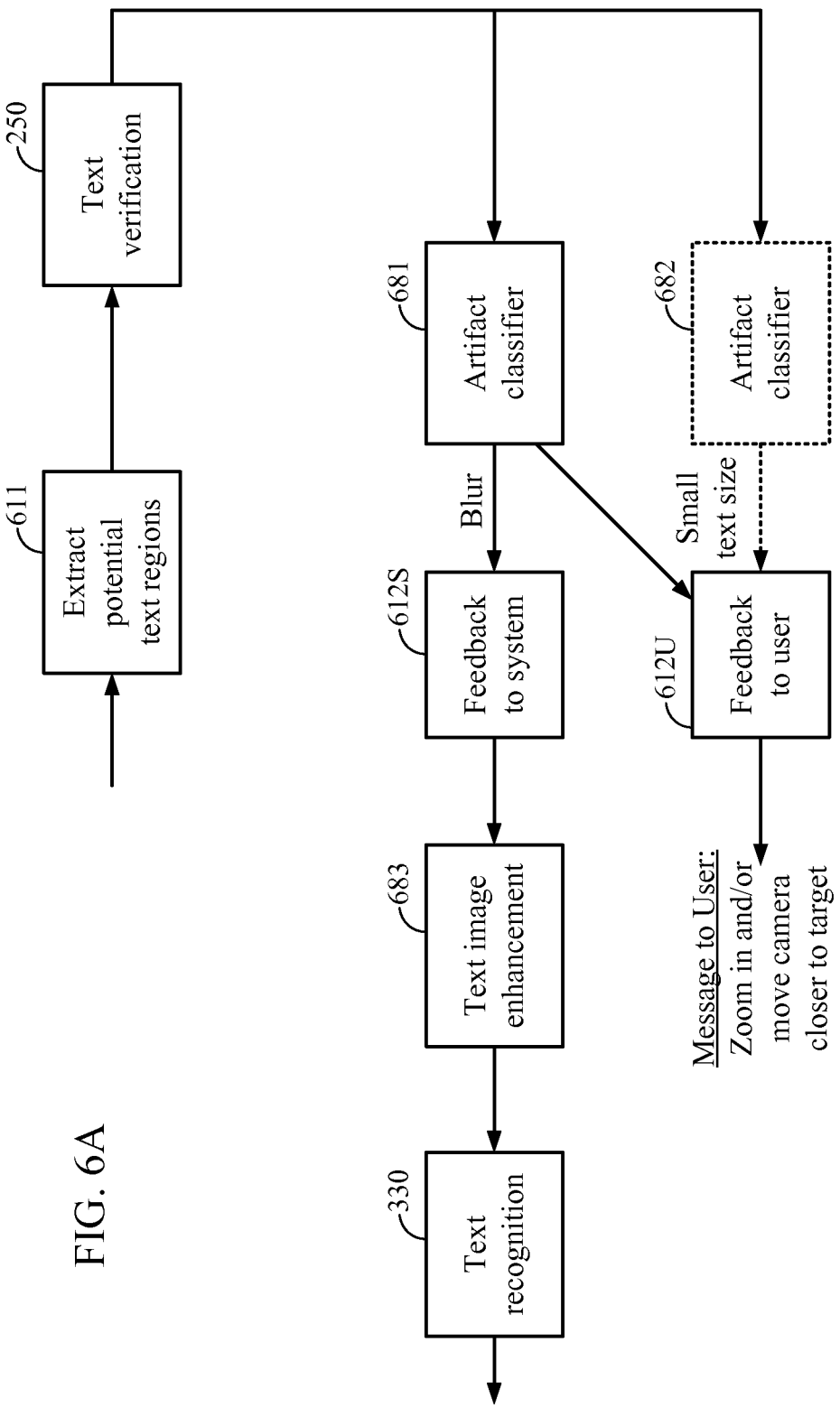
FIG. 6A illustrates, in a high-level data flow diagram, use of one or more artifact classifier(s) to identify artifacts in two different potential text regions of a single image, in some embodiments of the type illustrated in FIG. 2.
Figure 6B:
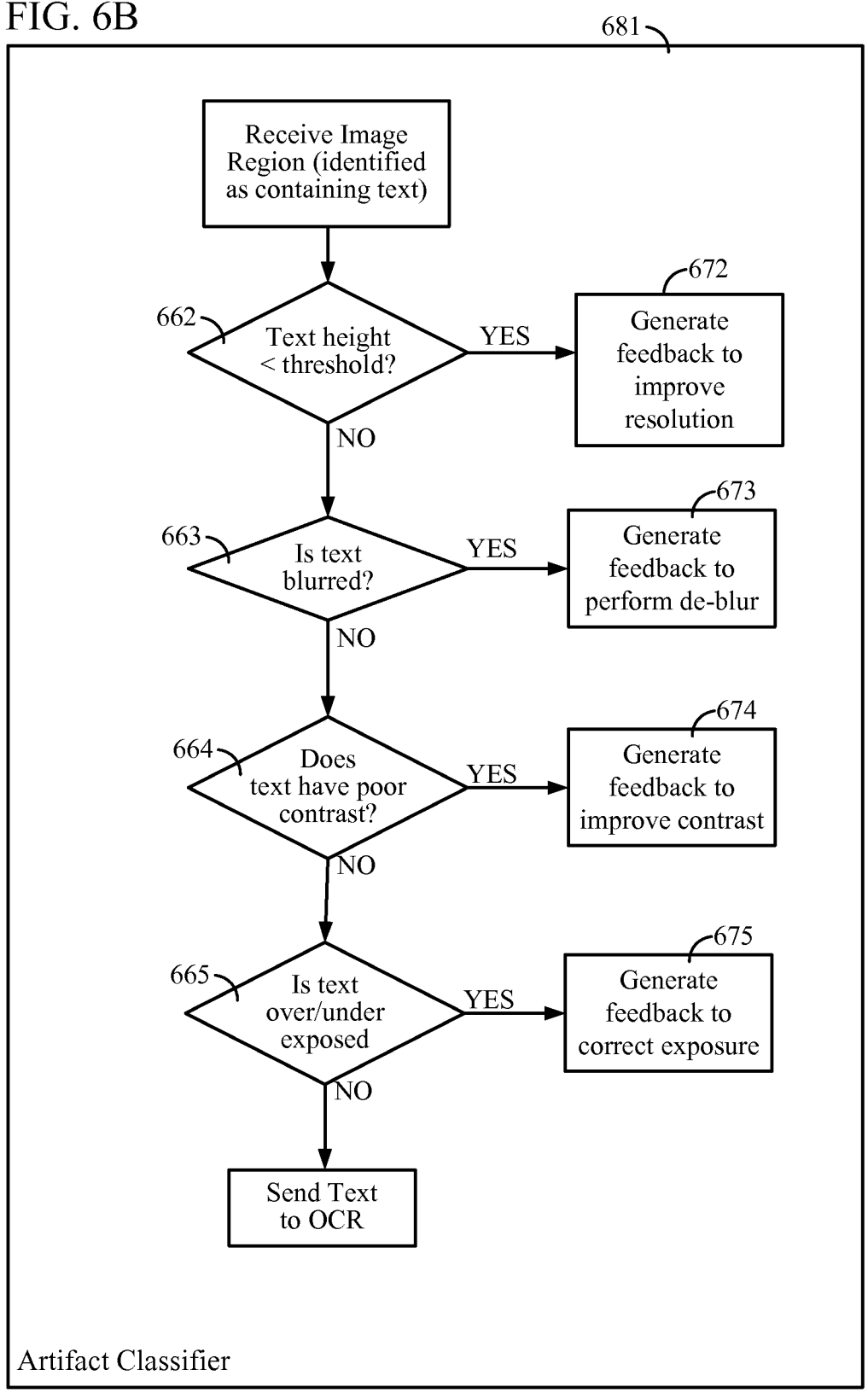
FIG. 6B illustrates, in a flowchart, acts performed by an artifact classifier 681 of FIG. 6A in some illustrative embodiments.

FIG. 6A illustrates, in a high-level data flow diagram, two different artifacts identified in two different potential text regions of a single image, in some embodiments of the type illustrated in FIG. 2. Specifically, in some embodiments, an artifact classifier 681 (FIG. 6A) receives a region that is identified as containing pixels of text by text verification block 250. The received region of text is evaluated by artifact classifier 681 (FIG. 6A) that checks whether the region meets a limit on blur, and further checks whether the region meets a limit on text size. For example, as illustrated in FIG. 6B, artifact classifier 681 of some embodiments checks in an act 662 whether the height of the received region is less than the limit, and, when the received region's size is found to be too small, feedback is provided (as per act 672 in FIG. 6B) by feedback module 612U (FIG. 6A) to the user, e.g. asking the user to zoom in or move closer to the target. Artifact classifier 681 further checks in act 663 (FIG. 6B) whether the received region of text is blurred and when the region is found to have blur, feedback is provided (as per act 673 in FIG. 6B) by feedback module 612S (FIG. 6A) to the system (in mobile device 401) to operate the module 683 (see FIG. 6A; also in mobile device 401) to enhance the image in the region, e.g. by using a de-blurring method to change intensities of pixels in the received region, optionally followed by text recognition in OCR module 330 as described above.

Artifact classifier 681 of some embodiments additionally checks in an act 664 (FIG. 6B) whether the text has poor contrast and when the region is found to have poor contrast, feedback is provided (as per act 674 in FIG. 6B) by feedback module 612S (FIG. 6A) to a system in mobile device 401 to operate module 683 to enhance the image in the region, e.g. by changing intensities of pixels in the region to improve contrast, optionally followed by text recognition in OCR module 330. Artifact classifier 681 may further check in an act 665 (FIG. 6B) whether the received region of text is overexposed or underexposed and when the region is found to not have proper exposure, feedback is provided (as per act 675 in FIG. 6B) by feedback module 612S (FIG. 6A) to the system to operate module 683 to enhance the image in the region by improving its exposure, optionally followed by text recognition in OCR module 330.

Although in some embodiments, a single artifact classifier 681 performs each of acts 662-665 (so that artifact classifier 681 is itself able to identify an artifact as blur in one case and small text size in another case and provide appropriate feedback), in other embodiments the acts of FIG. 6B may be performed in multiple artifact classifiers. For example, as illustrated in FIG. 6A, artifact classifiers 681 and 682 (both implemented in a mobile device 401) may respectively identify the two issues of blur and small text size. Accordingly, it should be readily apparent in view of this description that any number of artifact classifiers may be used depending on the embodiment, and such artifact classifiers may operate in parallel with one another or sequentially or in any combination thereof.

Figure 8A:
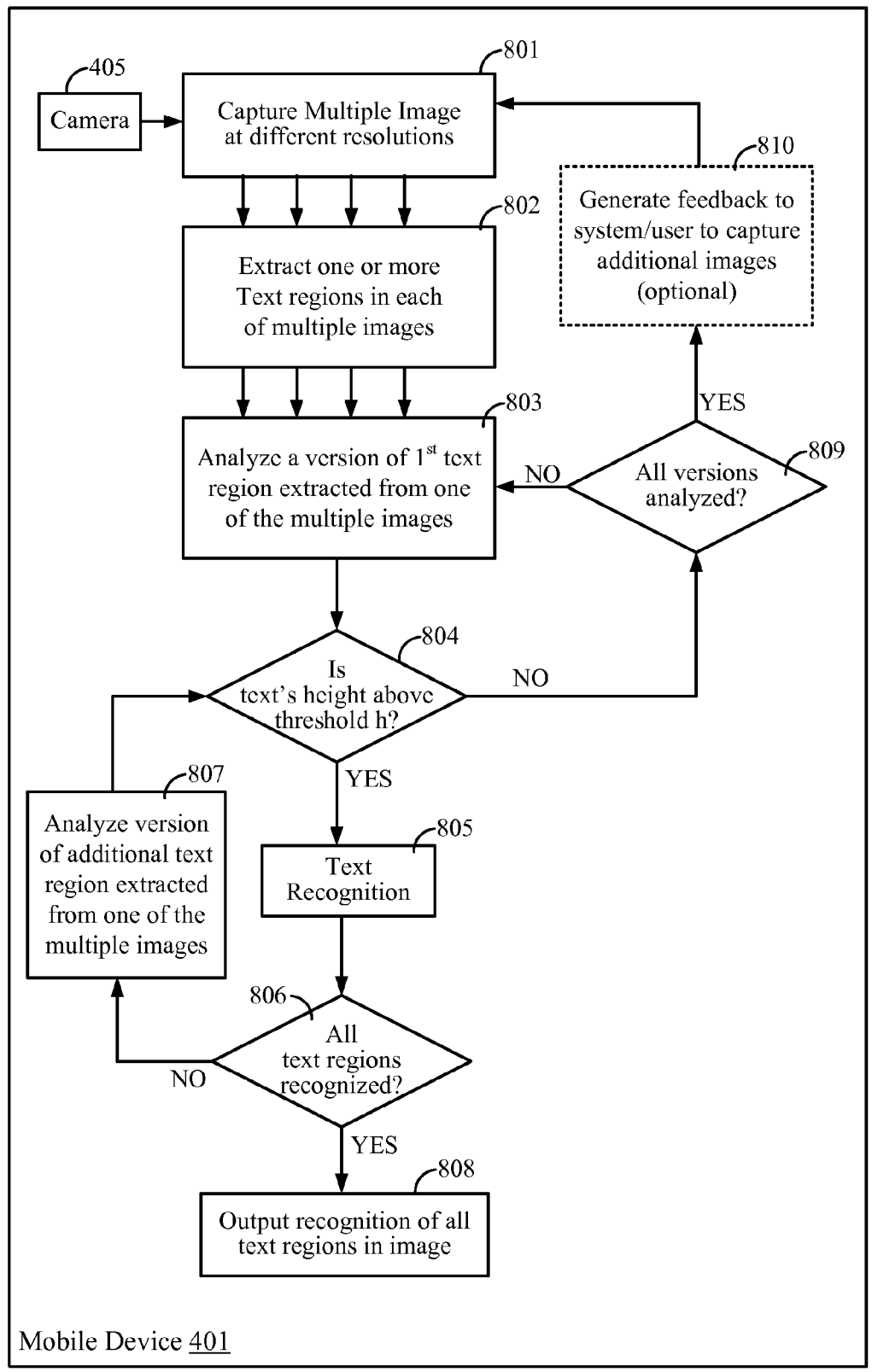
FIG. 8A illustrates, in a high-level block diagram, a mobile device of some embodiments, with text recognition improved by use of multiple images of identical text.

A mobile device 401 of some described embodiments includes one or more blocks (implemented in hardware or software or any combination thereof) that use multiple images of identical text, to improve text recognition as follows. Specifically, mobile device 401 of some embodiment includes a multi-image capture block 801 (FIG. 8A) that interoperates with a camera 405 to acquire therefrom, multiple images at different resolutions (e.g. at different zoom levels) of a scene of real world. The real world scene may have text of different sizes, e.g. on a billboard illustrated in FIG. 7, which has text regions 1101, 1102, 1103 and 1104 of different sizes. Such text regions are automatically extracted in mobile device 401 by an extraction block 802 that receives the multiple images of the real world scene from the multi-image capture block 801.

Mobile device 401 also includes an analysis block 803 that receives from extraction block 802 one or more of the text regions. Analysis block 803 analyzes an attribute that is relevant to OCR, such as height, of a version of a first text region extracted from one of the multiple images (by extraction block 802). Mobile device 401 also includes a decision block 804 that automatically checks whether the attribute (analyzed by analysis block 803) has a value that meets a predetermined limit of OCR, e.g. whether a text region's height is greater than 40 pixels.

When the answer in decision block 804 is yes, mobile device 401 operates a text recognition block 805 to identify a word in the text region. Mobile device 401 includes another decision block 806, to check whether all text regions have been recognized. When the answer is no, mobile device 401 analyzes a version of an additional text region extracted from one of the multiple images in another analysis block 807, followed by returning to decision block 804 (described above). In decision block 804, when the answer is no, mobile device 401 operates still another decision block 809 to check whether all versions have been analyzed and if not then analysis block 803 (described above) is again operated.

When the answer in decision block 809 is yes, mobile device 401 optionally operates a feedback module 810, followed by operating block 801 with or without feedback. Feedback module 810, when operated, generates a feedback signal internally to the system of mobile device 401 in some embodiments of the type illustrated in FIGS. 12A and 12B (described below). Hence, in some embodiments, the feedback is completely internal to the system, which may identify to multi-image capture block 801, one or more zoom levels that may be calculated dynamically, e.g. as illustrated in FIGS. 10A-10D (described below), or predetermined. In embodiments wherein one or more zoom levels are predetermined, multi-image capture block 801 may operate camera 405 to automatically (and without notifying the user) capture a sequence of images at a corresponding sequence of resolutions (or zoom levels) successively, one after another. In embodiments wherein zoom levels are calculated dynamically, multi-image capture block 801 may operate camera 405 to obtain additional images when one or more captured images of a scene has a text region that does not meet a limit of OCR. Alternatively or additionally, depending on the embodiment, a feedback signal may be used to expressly notify the user, e.g. by playing an audio message or displaying a visual message to a user, e.g. as illustrated in 11A and 11B (described below). When the answer in decision block 806 is yes, mobile device 401 operates a output block 808, to identify words of text of different sizes in the scene, recognized by use of multiple images of the scene.

Figure 8B:
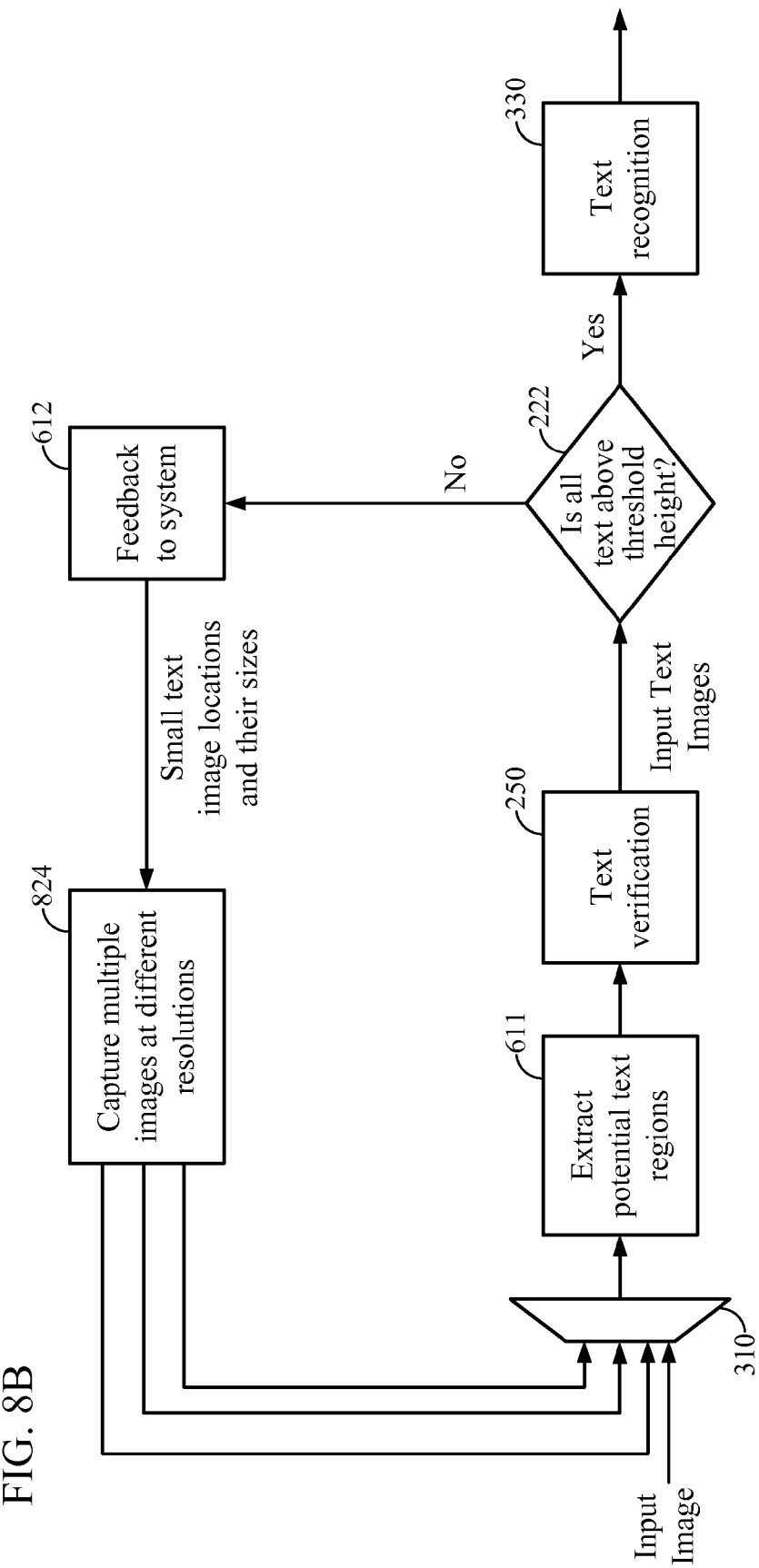
FIG. 8B illustrates, in a high level flow chart, automatic multi-resolution capture implemented in some embodiments to allow smaller size potential text regions 1102 and 1103 to be captured at higher resolutions by zooming in at their locations using multiple images.

Certain embodiments of the type illustrated in FIG. 8B, include a block 824 that automatically captures an initial set of images (e.g. 10 images) of a scene in succession, e.g. continuously one after another while automatically changing (e.g. increasing) the level of zoom in a manner that is similar, in some embodiments, to burst mode for capturing action sequences. The images in this initial set are stored in a memory 501 of mobile device 401, and available via a selector 310 that selects an individual image to be processed (e.g. initially a first image of a scene, and subsequently a second image of the same scene, both captured in the initial set of images at different resolutions relative to one another). The image selected by selector 310 is passed to text region extractor 611 that extracts one or more regions that are likely to be text of different sizes, e.g. in a poster 1100 in FIG. 7, text region 1102 is smaller than text region 1101 which in turn is smaller than text region 1103).

Figure 4A:
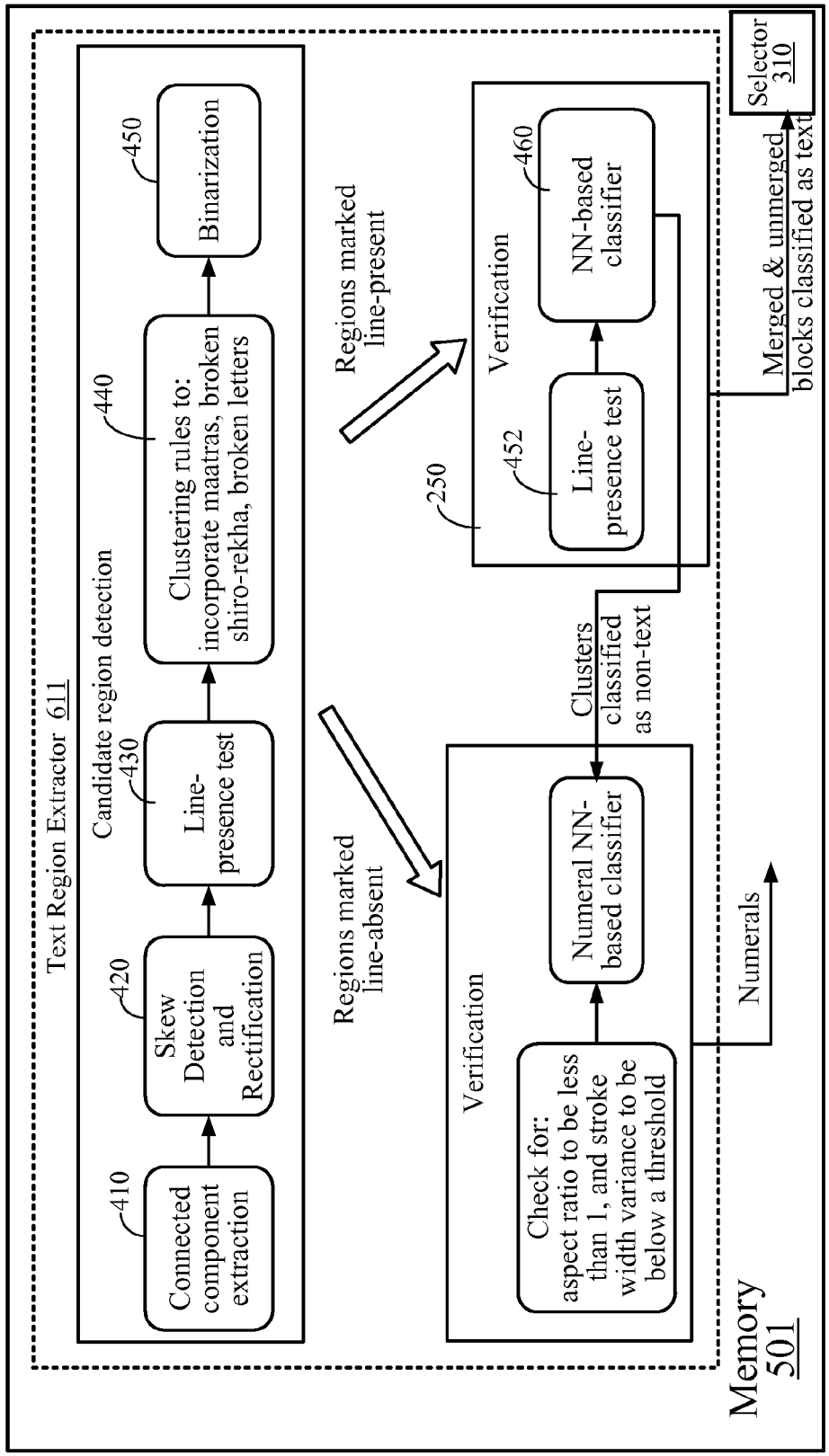
FIG. 4A illustrates a text region extractor that performs operation 210 of FIG. 3A.
Figure 4B:
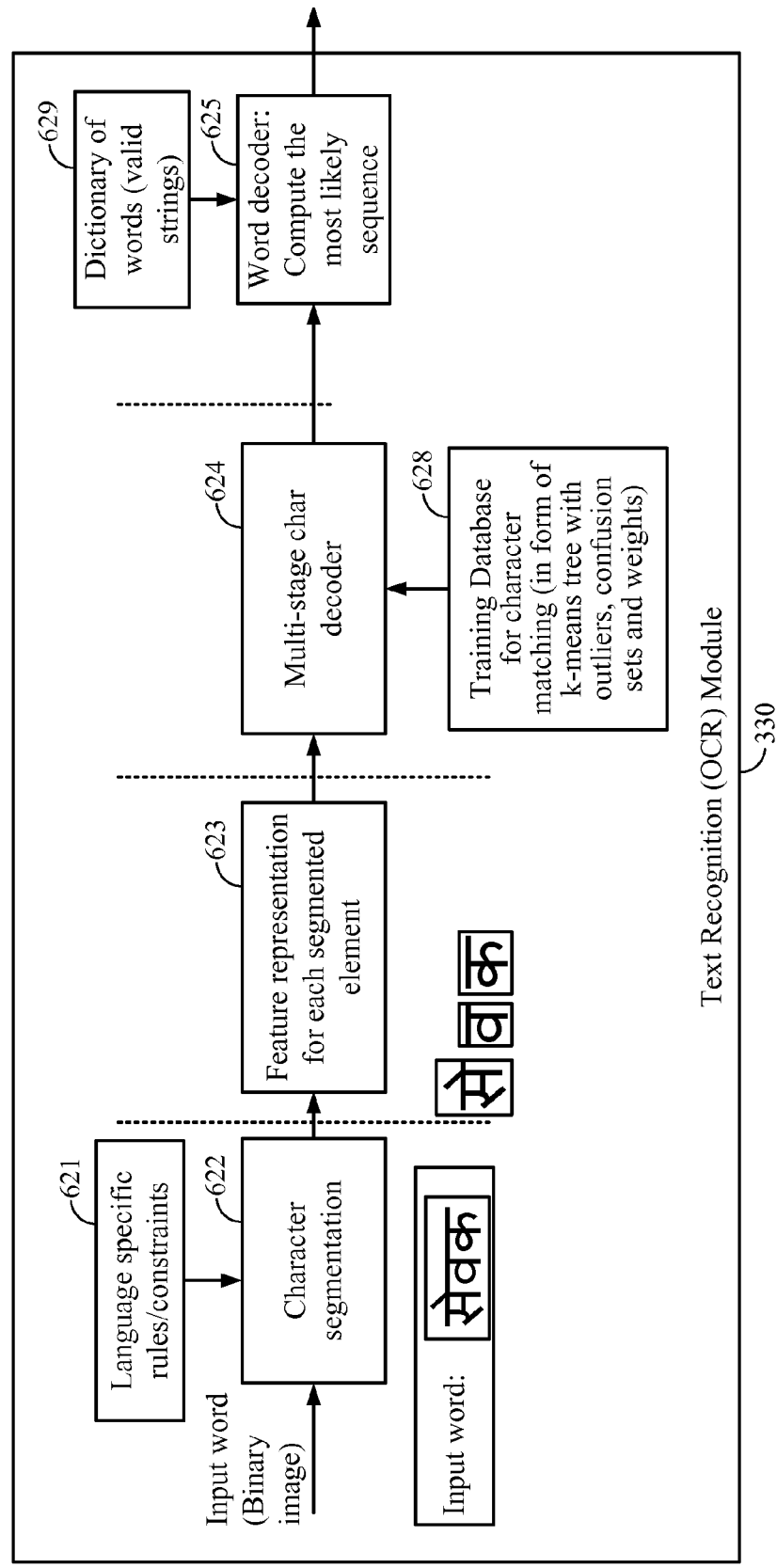
FIG. 4B illustrates an OCR module 330 that performs text recognition in an operation 230 of FIG. 3A.

Potential text regions are supplied by text region extractor 611 to text verification block 250 of the type illustrated in FIG. 4A (described above), which tests for presence of text (e.g. using a neural network). Regions that are known to be text output by text verification block 250 are checked for a specific attribute in act 222 (described above in reference to FIG. 2) performed by a processor 404 in mobile device 401. Regions having the specific attribute that meets the limit are supplied to OCR module 330 in the normal manner. When act 222 finds that one or more regions do not have attribute(s) that meet the limit, then feedback module 612 generates an internal feedback signal within mobile device 401 that identifies one or more regions in which the image quality is insufficient for OCR, e.g. locations of regions that have small text in the image, and their sizes. Such an internal feedback signal from feedback module 612 is used in some embodiments, to automatically retrieve another image from the initial set of multiple images captured at different resolutions in block 824 of some embodiments, and available to selector 310 (described above).

Capturing an initial set of multiple images at different resolutions in some embodiments eliminates a need to otherwise re-take one or more such images (either automatically or manually) simply to enlarge the size of a text region in response to finding that one or more text regions in the captured image happen to be too small to be subject to OCR. Instead, by capturing a predetermined number (e.g. 10) images up front makes available one or more images of higher resolution subsequently, e.g. when a text region of larger height is needed for OCR. For example, as soon as one image is captured, nine additional images may also be captured successively, at increasing resolutions, in order to capture text regions at correspondingly increasing sizes (if still within field of view).

Depending on the embodiment, when recognition of text in an image is completed successfully, one or more multi-resolution images in such a set may be discarded (while retaining an image in the set initially taken by a user), in order to make memory 501 in mobile device 401 available for storing a next set of images (which may be automatically captured at multiple resolutions in a burst mode, as soon as one image is captured). In some embodiments, each time the user operates a camera 405 in mobile device 401, a predetermined number of images are automatically captured at a predetermined number of zoom levels, without making the user aware that multiple images are captured, e.g. in response to a single user input (such as a single button press on mobile device 401, to operate a camera therein).

Accordingly, an electronic device and method of the type described herein check whether a region of an image has an attribute (e.g. height) that meets a limit for recognition of text in the region (e.g. imposed by an implementation of OCR in the electronic device and method). Specifically, in several embodiments, the limit applied by the electronic device and method is at the level of a region, i.e. an attribute of the region is being checked and hence in these embodiments the limit may also be called a region-level limit. In examples noted above, a region may need to be at least 40 pixels in height, in order for a sequence of characters in the region to be recognized with sufficient accuracy. The limit on a region's attribute depends on a specific implementation of OCR in the electronic device and method, and a level of accuracy that may be specified (e.g. 90% accuracy). A limit on the height of a region required in an embodiment of the electronic device and method may be predetermined empirically e.g. by repeated use of the electronic device and method on regions in an image of words (each of which has a height of a single character), in a specific language targeted for recognition, e.g. Hindi.

When a test for presence of text is met by a region and when the attribute of the region satisfies a limit thereon, an electronic device and method of the type described herein may provide the region as input to the OCR module 330, followed by storing in a memory 501 a result of the optical character recognition (e.g. one or more words recognized as present in the region, optionally with a probability indicative of confidence in the recognition). Such a result may be thereafter used in the normal manner, e.g. to translate a word of Hindi text recognized in the image into English (e.g. as illustrated in FIG. 11C).

When the test for presence of text is met by a region of an image, but the attribute of the region does not satisfy a limit thereon, an electronic device and method of the type described herein may be configured to perform various acts depending on the embodiment. Some embodiments repeat one or more of the above-described acts on an additional image which contains a region corresponding to the specific region. The additional image may be one of multiple such images captured of the same scene in the real world, and having different values for a corresponding region's attribute (e.g. height). Specifically, as noted above, some embodiments capture a set of a predetermined number of images (e.g. 10 images) of a scene of real world up front, at the same time as a single image is captured, before any regions are identified within an image, and before any regions are known to be inadequate (in any manner) to be input to OCR. Capturing a set of images at increasing zoom levels enables OCR of text regions in an earlier-captured image in the set that are too small for OCR, to be still subject to OCR by performing OCR on enlarged versions of these same text regions in later-captured images in the set. Capture of a set of images initially (instead of a single image) eliminates the need to re-take an image subsequently on finding that text regions are too small to be input to OCR. Additionally, taking multiple images initially in a set containing multiple sizes of text allows such embodiments to recognize/OCR differently sized regions of text, followed by internal correlation of a first text region across images, followed by presenting the recognized text to a user, without requiring additional images to be taken in order to recognize text.

As noted above, certain embodiments may generate a feedback signal indicative of a need to capture another image containing the specific region, to improve the region's attribute so as to meet the limit of OCR. The feedback signal may be used by the electronic device and method to automatically operate a camera (e.g. to zoom into the same scene) to obtain the additional image, or to prompt the user (e.g. by displaying a message on a screen, or by playing an audio message) to operate the camera to obtain the additional image.

Accordingly, several embodiments provide image quality based feedback for improving recognition of text in individual regions of camera captured images. Such feedback for individual regions eliminates issues arising from low quality of camera captured text images leading to poor text recognition in some regions (e.g. 1102 and 1104 in FIG. 7) v/s good text recognition in other regions (e.g. 1101 and 1103 in FIG. 7) of the same image (e.g. image of bill board 1100). More specifically, feedback to the user (see FIGS. 11A and 11B) or the system (see FIGS. 12A and 12B) of the type described above, based on image quality of text regions in an image, results in suitable control action to improve image quality in regions identified as text, which in turn improves recognition performance. Therefore, several embodiments use a mechanism to provide feedback to the user or the system that can help improve text recognition in camera images. Such embodiments may include one or more of the following: 1) Determining features that are sensitive to artifacts in images inhibiting text recognition 2) Identifying artifact types that cause poor recognition by building an artifact classifier 3) Providing feedback to either the user or the system depending on the artifact types. Feedback to the user includes a set of recommended actions that can be taken by the user. Feedback to the system includes instructions for image enhancement followed by recognition. Such embodiments appear to have the following benefits: improving user experience by providing further robustness to various imaging conditions, and image quality feedback is helpful in enabling text recognition in a wider range of real world scenarios.

Mobile device 401 (FIG. 9) of some embodiments that performs a method of the type shown in FIGS. 2, 3A, 3D, 10A, 10B and 10C can be any hand-held device, such as a smartphone that includes a camera 405 (FIG. 9) of the type described above to generate an image of a real world scene that is then processed to identify any characters of Devanagari therein. As noted above, mobile device 401 may further include sensors 406 that provide information on movement of mobile device 401, such as an accelerometer, a gyroscope, a compass, or the like. Mobile device 401 may use an accelerometer and a compass and/or other sensors to sense tilting and/or turning in the normal manner, to assist processor 404 in determining the orientation and position of a predetermined symbol in an image captured in mobile device 401. Instead of or in addition to sensors 406, mobile device 401 may use images from a camera 405 to assist processor 404 in determining the orientation and position of mobile device 401 relative to the predetermined symbol being imaged.

Also, mobile device 401 may additionally include a graphics engine 1004 and an image processor 1005 that are used in the normal manner. Mobile device 401 may optionally include OCR module 330 (e.g. implemented by one or more processor(s) 404 executing the software 610 in memory 501) to identify characters of text in blocks received as input by OCR module 330 (when software therein is executed by processor 404).

In addition to memory 501, mobile device 401 may include one or more other types of memory such as flash memory (or SD card) 1008 and/or a hard disk and/or an optical disk (also called "secondary memory") to store data and/or software for loading into memory 501 (also called "main memory") and/or for use by processor(s) 404. Mobile device 401 may further include a wireless transmitter and receiver in transceiver 1010 and/or any other communication interfaces 1009. It should be understood that mobile device 401 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform that is capable of creating an augmented reality (AR) environment.

A mobile device 401 of the type described above may include other position determination methods such as object recognition using "computer vision" techniques. The mobile device 401 may also include means for remotely controlling a real world object which may be a toy, in response to user input on mobile device 401 e.g. by use of transmitter in transceiver 1010, which may be an IR or RF transmitter or a wireless a transmitter enabled to transmit one or more signals over one or more types of wireless communication networks such as WiFi, cellular wireless network or other network. The mobile device 401 may further include, in a user interface, a microphone and a speaker (not labeled). Of course, mobile device 401 may include other elements unrelated to the present disclosure, such as a read-only-memory 1007 which may be used to store firmware for use by processor 404.

Also, depending on the embodiment, a mobile device 401 may detect characters of text in images, in implementations that operate the OCR module 330 to identify, e.g. characters of Devanagari alphabet in an image. Any one or more character decoders, word dictionary and feedback module may be implemented in software (executed by one or more processors or processor cores) or in hardware or in firmware, or in any combination thereof.

In some embodiments of mobile device 401, functionality in the above-described OCR module 330 is implemented by a processor 404 executing the software 610 in memory 501 of mobile device 401, although in other embodiments such functionality is implemented in any combination of hardware circuitry and/or firmware and/or software in mobile device 401. Hence, depending on the embodiment, various functions of the type described herein may be implemented in software (executed by one or more processors or processor cores) or in dedicated hardware circuitry or in firmware, or in any combination thereof.

Figure 10A:
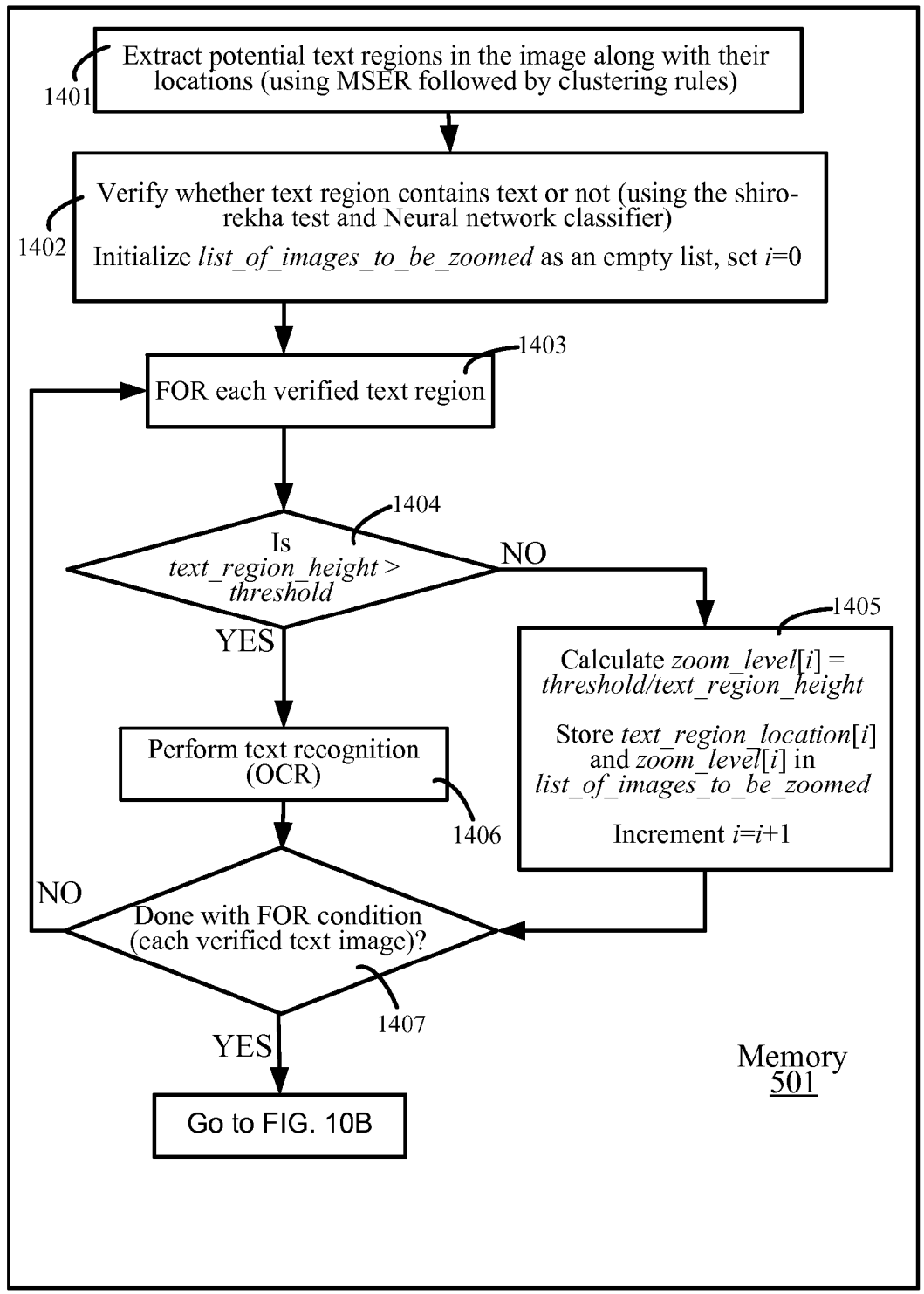
FIG. 10A illustrates, in an intermediate-level flow chart, acts performed by one or more processors 404 in some embodiments to evaluate each region that is likely to be text in an image received from a camera, and determine a level of zoom (for each potential text region).
Figure 10B:
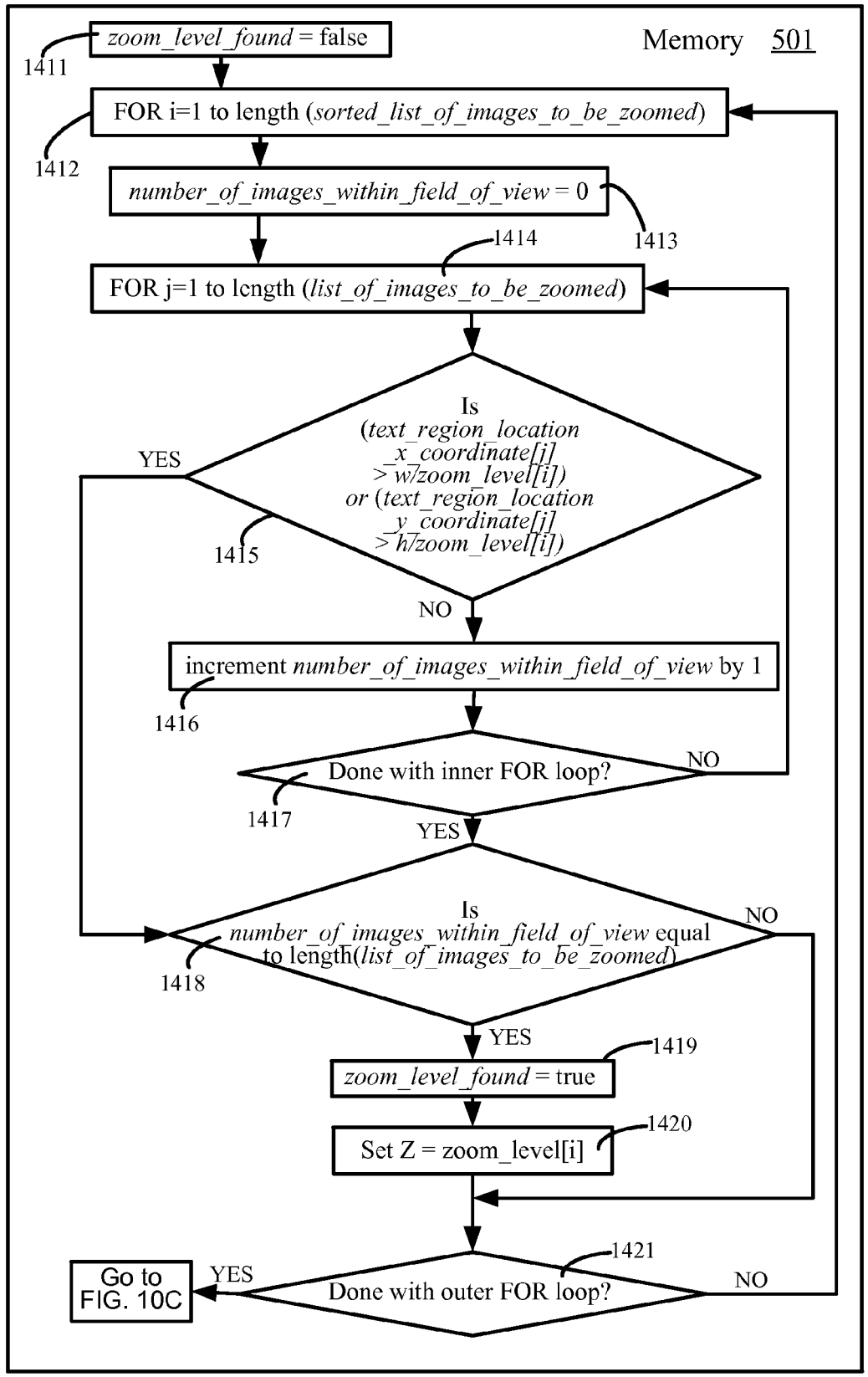
FIG. 10B illustrates, in an intermediate-level flow chart, acts performed by one or more processors 404 in some embodiments to sort a list with respect to zoom level in decreasing order, and identify a maximum zoom level (Z) which retains all text regions from this list in camera field of view.
Figure 10C:
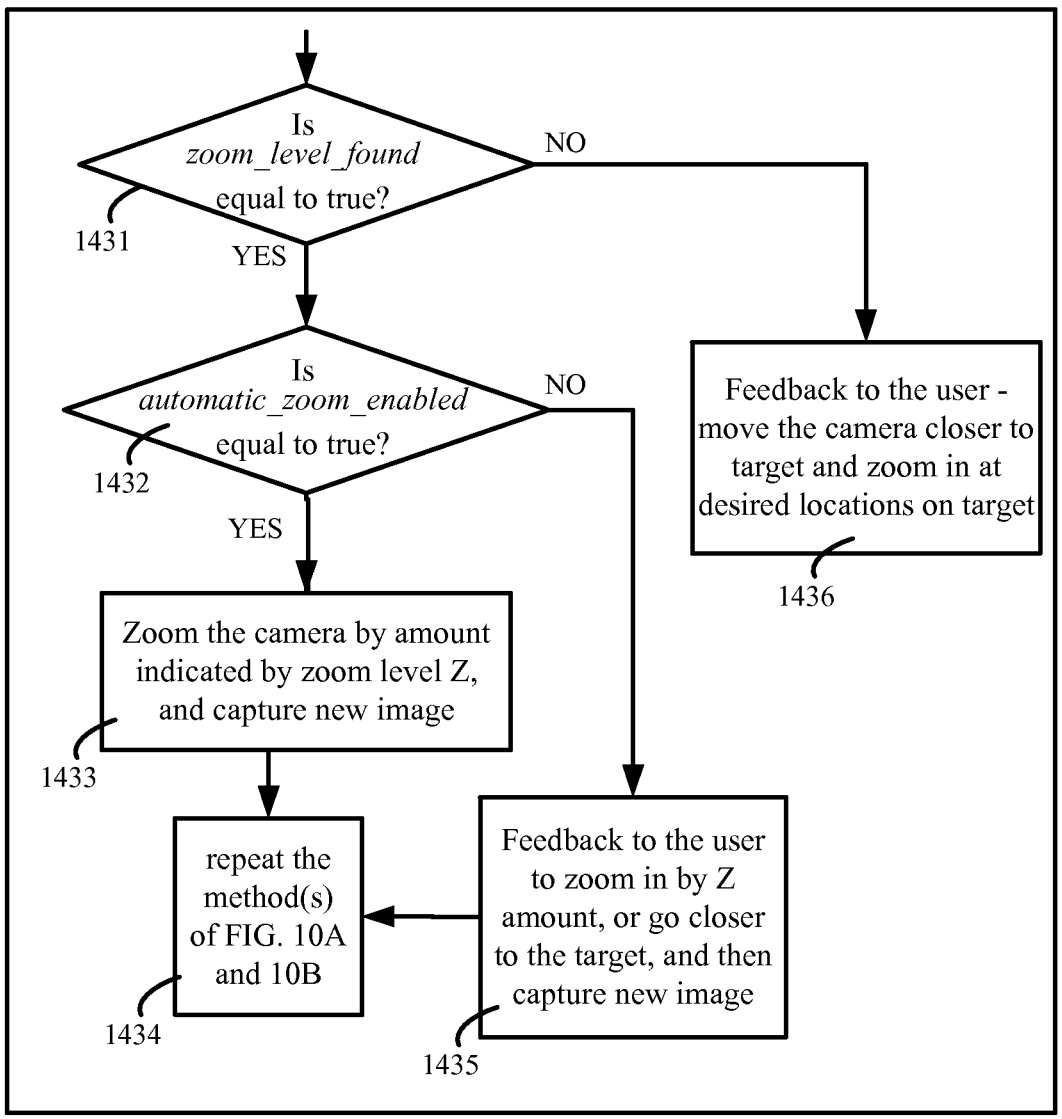
FIG. 10C illustrates, in an intermediate-level flow chart, acts performed by one or more processors 404 in some embodiments to zoom in to an appropriate zoom level while retaining within the field of view, text regions that are to be re-imaged.

Some embodiments of mobile device 401 include a processor 404 executing the software 610 in memory 501 to perform the acts 1401-1407 of FIG. 10A, acts 1411-1421 of FIG. 10B, and acts 1431-1435 of FIG. 10C. Specifically, in act 1401, processor 404 extracts potential text regions in the image, along with their location (e.g. using MSER, followed by using clustering rules). Then, in act 1402, processor 404 verifies whether text region contains text or not (using the shiro-rekha test and Neural network classifier), and initializes a list_of_images_to_be_zoomed as an empty list, and sets i=0. Then in act 1403, processor 404 enters a loop, for each verified text region, to perform acts 1404-1407, as follows. In act 1404, processor 404 checks Is text_region_height>threshold and if the answer is yes, then OCR is performed in act 1406, followed by act 1407 to check if the for loop may be terminated, and if not returns to act 1403. When the answer is no in act 1404, then processor 404 calculates zoom_level[i]=threshold/text_region_height and stores text_region_location[i] and zoom_level[i] in list_of_images_to_be_zoomed. and then increments i=i+1. Then processor 404 goes to act 1407. In act 1407, if the answer is yes, then processor 404 goes to the method shown in FIG. 10B.

In the method of FIG. 10B, processor 404 is programmed to sort the list of the method of FIG. 10A with respect to zoom level in decreasing order, and identify maximum zoom level (Z) which retains all text regions from this list, in camera field of view. Such maximum zoom level (Z) can thereafter be used to capture one or more images, for use in extraction of text regions to be subject to OCR. Specifically, in act 1411, processor 404 sets zoom_level_found=false followed by entering an outer loop in act 1412 using i as a looping variable from i=1 to length of the sorted_list_of_images_to_be_zoomed. Next, in act 1413, processor 404 sets number_of_images_within_field_of_view=0 followed by entering an inner loop in act 1414 using j as a looping variable from j=1 to length of list_of_images_to_be_zoomed.

Figure 10D:
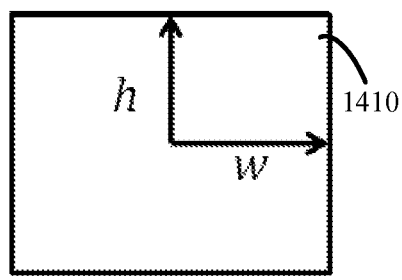
FIG. 10D illustrates, notation "h" and "w" used in the method of FIG. 10B, relative to an image captured by a camera.

Thereafter, in act 1415, processor 404 checks if an x-coordinate of the region of text is greater than w/zoom_level, or if a y-coordinate of the region is greater than h/zoom_level, wherein w is the width of the region and h is the height of region 1410 as illustrated in FIG. 10D. The x-coordinate that is checked in act 1415 of some embodiments is an "extreme" x-coordinate of the region (e.g. a largest value (in the positive x direction) or a smallest value (in the negative x direction), among x-coordinates that in a list of coordinates of pixels in the region). Use of an extreme x-coordinate or a farthest x-coordinate addresses situations in which the center of a region lies within the field of view but not the extreme x-coordinate. Similarly, a y-coordinate that is checked is also the largest value or the smallest value among y-coordinates in the list of coordinates of pixels in the region. Note that the location of the text region is measured, in some embodiments, with respect to the center of the original image. Also, note that extreme can refer to extreme right or extreme left, depending on whether the text region lies in the right half or left half of the original image.

If the answer in act 1415 is yes, then processor 404 goes to act 1418, to check if the number of images in the field of view is equal to the length of the list of images to be zoomed (e.g. number of regions found by artifact classifier 320 to not meet a limit for OCR). If the answer in act 1418 is no, processor 404 goes to act 1421 (described below).

If the answer in act 1415 is no, processor 404 increments by 1 the variable number_of_images_within_field_of_view and goes to act 1417 to check if the inner loop is completed and if not completed returns to act 1414. When the inner for loop is completed in act 1417, then processor 404 goes to act 1418 (described above). If in act 1418, the answer is yes, then processor 404 goes to act 1419, and sets the flag zoom_level_found=true, followed by act 1420 to set the variable Z=zoom_level[i], followed by act 1421 to check if the outer loop is completed and if not returns to act 1412. When the outer for loop is completed, processor 404 goes to the method of FIG. 10C.

In the method of FIG. 10C, processor 404 is programmed to perform automatic zoom or provide feedback to the user, depending on the outcome of processing in the methods of FIGS. 10A and 10B. Specifically, in act 1431, if the zoom_level_found is false then act 1436 is performed to display a message to the user, to move the camera closer to the target and zoom in at the desired locations on the target. If the answer in act 1431 is yes, then act 1432 is performed to check if automatic zoom is enabled, and if not then act 1435 is performed in a manner similar to act 1436 described above, followed by act 1434 to repeat the method of FIGS. 10A and 10B. When the answer in act 1432 is yes, then in act 1433 the camera is automatically operated to increase the zoom level, to the amount indicated by the variable Z, and a new image is captured, followed by act 1434 (described above).

Accordingly, depending on the embodiment, any one or more components of OCR module 330 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware 1013 (FIG. 9) or software 610, or hardware 1012 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any machine-readable medium tangibly embodying software instructions (also called "computer instructions") may be used in implementing the methodologies described herein. For example, software 610 (FIG. 9) may include program codes stored in memory 501 and executed by processor 404. Memory may be implemented within or external to the processor 404. If implemented in firmware and/or software, the functions may be stored as one or more instructions or code on a computer-readable medium. Examples include non-transitory computer-readable storage media encoded with a data structure and non-transitory computer-readable storage media encoded with a computer program.

One or more non-transitory computer-readable storage media includes physical computer storage media. A non-transitory computer-readable storage medium may be any available non-transitory medium that can be accessed by a computer, and holds information (such as software and/or data). By way of example, and not limitation, such a non-transitory computer-readable storage medium can comprise RAM, ROM, Flash Memory, EEPROM, CD-ROM or other optical disk storage, magnetic disk storage or other magnetic storage devices, or any other non-transitory medium that can be used to store program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media described herein.

Although specific embodiments have been described for instructional purposes, the other embodiments will be readily apparent in view of this description. Hence, although an item shown in FIG. 2 of some embodiments is a mobile device 401, in other embodiments the item (which includes memory 501 and processor(s) 404) is implemented by use of form factors that are different, e.g. in certain other embodiments the item is a mobile platform (such as a tablet, e.g. iPad available from Apple, Inc.) while in still other embodiments the item is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer 1015 communicating over one or more wireless link(s) with sensors and user input circuitry enclosed in a housing that is small enough to be held in a hand.

Depending on a specific artifact recognized in a handheld camera captured image, a user can receive different types of feedback depending on the embodiment. Additionally haptic feedback (e.g. by vibration of mobile device 401) is provided by triggering the haptic feedback circuitry 1018 (FIG. 9) in some embodiments, to provide feedback to the user to move the camera closer to the target and/or zoom in on desired locations on the target. Instead of the just-described haptic feedback, audio feedback may be provided via a speaker in mobile device 601, in other embodiments.

Various adaptations and modifications may be made without departing from the scope of the described embodiments, as will be readily apparent to the skilled artisan in view of this description. Accordingly, numerous such embodiments are encompassed by the appended claims.

The invention claimed is:

1. A method to improve text recognition by using multiple images of identical text, the method comprising:
   capturing a plurality of images of a scene of real world at a plurality of zoom levels, said scene of real world containing text of one or more sizes;
   extracting from each of the plurality of images, one or more text regions;
   analyzing an attribute that is relevant to OCR in one or more versions of a first text region as extracted from one or more of said plurality of images;
   when the attribute has a value that meets a limit of optical character recognition (OCR) in a version of the first text region, providing the version of the first text region as input to OCR;
   when the value of the attribute does not meet the limit of OCR, calculating a new zoom level at which the attribute of the first text region meets the limit of OCR, and storing at least an identification of the first text region in a list;
   repeating the providing or the calculating, with other text regions extracted from the plurality of images;
   using the list to identify a maximum zoom level that retains all text regions in the list within a field of view of a camera; and
   based on the maximum zoom level, generating feedback to capture at least one additional image.

2. The method of claim 1 wherein:
the attribute comprises height of each region in the one or more text regions.

3. The method of claim 1 wherein:
the extracting comprises checking for presence of a line of pixels of a common binary value in the one or more text regions.

4. The method of claim 1 wherein:
the extracting comprises checking a variance in width of a stroke of a character in the one or more text regions.

5. The method of claim 1 wherein said using of the list to identify the maximum zoom level comprises:
   checking if an extreme x-coordinate of the first text region is greater than w/zoom_level, wherein w is a width of the first text region and zoom_level is a level of zoom at which an image comprising the first text region is captured by the camera;
   when the extreme x-coordinate is greater than w/zoom_level, further checking whether a number of images within a field of view is equal to a length of the list; and
   when the number of images within the field of view is equal to the length of the list, setting at least one of a flag or a variable.

6. The method of claim 1 wherein said using of the list to identify the maximum zoom level comprises:
   checking if an extreme y-coordinate of the first text region is greater than h/zoom_level, wherein h is a height of the first text region and zoom_level is a level of zoom at which an image comprising the first text region is captured by the camera;
   when the extreme y-coordinate is greater than h/zoom_level, further checking whether a number of images within a field of view is equal to a length of the list; and
   when the number of images within the field of view is equal to the length of the list, setting at least one of a flag or a variable.

7. The method of claim 1 wherein:
the plurality of images are captured in a sequence successively one after another.

8. The method of claim 7 wherein:
the plurality of images are captured prior to said extracting.

9. The method of claim 7 wherein:
said plurality of images are automatically captured in response to a single user input.

10. The method of claim 1 wherein:
a feature in the scene of real world not captured in said at least one additional image comprising an enlarged version of the first text region is captured in an image in the plurality of images that comprises a smaller version of the first text region.

11. The method of claim 1 further comprising:
providing a user with said feedback generated based on the maximum zoom level.

12. The method of claim 1 further comprising:
analyzing an attribute that is relevant to OCR in one or more versions of a second text region as extracted from one or more of said plurality of images; and
when the attribute has a value that meets a limit of optical character recognition (OCR) in a version of the second text region, providing the version of the second text region as input to OCR.

13. The method of claim 12 further comprising:
outputting text recognized in said first and second regions.

14. At least one non-transitory computer readable storage media comprising a plurality of instructions to be executed by at least one processor to obtain multiple images for use in text recognition, the plurality of instructions comprising:
first instructions to capture a plurality of images of a scene of real world at a plurality of zoom levels, said scene of real world containing text of one or more sizes;
second instructions to extract from each of the plurality of images, one or more text regions;
third instructions to analyze an attribute that is relevant to OCR in one or more versions of a first text region as extracted from one or more of said plurality of images;
fourth instructions to provide the version of the first text region as input to OCR, when the attribute has a value that meets a limit of optical character recognition (OCR) in a version of the first text region;
fifth instructions to calculate a new zoom level at which the attribute of the first text region meets the limit of OCR and store at least an identification of the first text region in a list, when the value of the attribute not meeting the limit of OCR;
sixth instructions to repeatedly execute the fourth instructions and the fifth instructions, with other text regions extracted from the plurality of images;
seventh instructions to use the list to identify a maximum zoom level that retains all text regions in the list within a field of view of a camera; and
based on the maximum zoom level, eighth instructions to generate feedback to capture at least one additional image.

15. The at least one non-transitory computer readable storage media of claim 14 wherein:
the attribute comprises height of each region in the one or more text regions.

16. The at least one non-transitory computer readable storage media of claim 14 wherein:
the second instructions comprise instructions to check for presence of a line of pixels of a common binary value in the one or more text regions.

17. The at least one non-transitory computer readable storage media of claim 14 wherein:
the second instructions comprise instructions to check a variance in width of a stroke of a character in the one or more text regions.

18. The at least one non-transitory computer readable storage media of claim 14 further comprising:
fifth instructions to check if an extreme x-coordinate of the first text region is greater than w/zoom_level, wherein w is a width of the first text region and zoom_level is a level of zoom at which an image comprising the first text region is captured by the camera;
sixth instructions to be executed when the extreme x-coordinate is greater than w/zoom_level, to further check whether a number of images within a field of view is equal to a length of the list; and
seventh instructions to be executed when the number of images within the field of view is equal to the length of the list, to set at least one of a flag or a variable.

19. The at least one non-transitory computer readable storage media of claim 14 further comprising:
fifth instructions to check if an extreme y-coordinate of the first text region is greater than h/zoom_level, wherein h is a height of the first text region and zoom_level is a level of zoom at which an image comprising the first text region is captured by the camera;
sixth instructions to be executed when the extreme y-coordinate is greater than h/zoom_level, to further check whether a number of images within a field of view is equal to a length of the list; and
seventh instructions to be executed when the number of images within the field of view is equal to the length of the list, to set at least one of a flag or a variable.

20. The at least one non-transitory computer readable storage media of claim 14 wherein:
the plurality of images are captured in a sequence successively one after another.

21. The at least one non-transitory computer readable storage media of claim 14 wherein:
a feature in the scene of real world not captured in said at least one additional image comprising an enlarged version of the first text region is captured in an image in the plurality of images that comprises a smaller version of the first text region.

22. A mobile device to decode text in real world images, the mobile device comprising:
a camera;
a memory operatively connected to the camera to receive at least an image therefrom, the image comprising one or more text regions;
at least one processor operatively connected to the memory to execute a plurality of instructions stored in the memory;
wherein the plurality of instructions cause the at least one processor to:
capture a plurality of images of a scene of real world at a plurality of zoom levels, said scene of real world containing text of one or more sizes;
extract from each of the plurality of images, one or more text regions;
analyze an attribute that is relevant to OCR in one or more versions of a first text region as extracted from one or more of said plurality of images; and
when the attribute has a value that meets a limit of optical character recognition (OCR) in a version of the first text region, provide the version of the first text region as input to OCR;
when the value of the attribute does not meet the limit of OCR, calculate a new zoom level at which the attribute of the first text region meets the limit of OCR, and storing at least an identification of the first text region in a list;
repeat execution of instructions to provide or instructions to calculate, with other text regions extracted from the plurality of images;
use the list to identify a maximum zoom level that retains all text regions in the list within a field of view of a camera; and
based on the maximum zoom level, generate feedback to capture at least one additional image.

23. The mobile device of claim 22 wherein:
the attribute comprises height of each region in the one or more text regions.

24. The mobile device of claim 22 wherein:
the instructions that cause the at least one processor to extract comprise instructions to check for presence of a line of pixels of a common binary value in the one or more text regions.

25. The mobile device of claim 22 wherein the at least one processor is further configured to:
check a variance in width of a stroke of a character in the one or more text regions.

26. The mobile device of claim 22 wherein:
the plurality of images are captured in a sequence successively one after another.

27. The mobile device of claim 22 wherein:
a feature in the scene of real world not captured in said at least one additional image comprising an enlarged version of the first text region is captured in an image in the plurality of images that comprises a smaller version of the first text region.

28. A mobile device comprising:
a camera configured to capture a plurality of images of a scene of real world at a plurality of zoom levels, said scene of real world containing text of one or more sizes;
a memory coupled to the camera for storing the plurality of images;
means, coupled to the memory, for extracting from each of the plurality of images, one or more text regions;
means for analyzing an attribute that is relevant to OCR in one or more versions of a first text region as extracted from one or more of said plurality of images;
responsive to the attribute having a value that meets a limit of optical character recognition (OCR) in a version of the first text region, means for providing the version of the first text region as input to OCR;
responsive to the value of the attribute not meeting the limit of OCR, means for calculating a new zoom level at which the attribute of the first text region meets the limit of OCR, and storing at least an identification of the first text region in a list;
means for repeatedly invoking the means for providing or the means for calculating, with other text regions extracted from the plurality of images;
means for using the list to identify a maximum zoom level that retains all text regions in the list within a field of view of a camera; and
based on the maximum zoom level, means for generating feedback to capture at least one additional image.

* * * * *